United States Patent
Matsuoka et al.

(10) Patent No.: US 8,950,686 B2
(45) Date of Patent: Feb. 10, 2015

(54) CONTROL UNIT WITH AUTOMATIC SETBACK CAPABILITY

(75) Inventors: Yoky Matsuoka, Palo Alto, CA (US); Frank E. Astier, Mountain View, CA (US); Rangoli Sharan, Sunnyvale, CA (US); Anthony Michael Fadell, Portola Valley, CA (US)

(73) Assignee: Google Inc., Mountain View, CA (US)

( * ) Notice: Subject to any disclaimer, the term of this patent is extended or adjusted under 35 U.S.C. 154(b) by 578 days.

(21) Appl. No.: 13/279,151

(22) Filed: Oct. 21, 2011

(65) Prior Publication Data
US 2012/0186774 A1 Jul. 26, 2012

Related U.S. Application Data

(60) Provisional application No. 61/415,771, filed on Nov. 19, 2010, provisional application No. 61/429,093, filed on Dec. 31, 2010.

(51) Int. Cl.
G05D 23/19 (2006.01)
F24F 11/00 (2006.01)

(52) U.S. Cl.
CPC .......... *G05D 23/1904* (2013.01); *F24F 11/0034* (2013.01); *F24F 2011/0075* (2013.01)
USPC ............................ 236/46 C; 62/231; 700/276

(58) Field of Classification Search
CPC .............. F24F 11/0034; F24F 11/0086; F24F 2011/0073; F25B 2600/01; Y02N 30/762
USPC .................. 236/1 C, 46 R, 46 C; 62/157, 231; 165/237; 700/276
See application file for complete search history.

(56) References Cited

U.S. PATENT DOCUMENTS

| 3,991,357 A | 11/1976 | Kaminski |
| 4,223,831 A | 9/1980 | Szarka |

(Continued)

FOREIGN PATENT DOCUMENTS

| CA | 2202008 | 2/2000 |
| EP | 196069 | 12/1991 |

(Continued)

OTHER PUBLICATIONS

Aprilaire Electronic Thermostats Model 8355 User's Manual, Research Products Corporation, Dec. 2000, 16 pages.

(Continued)

*Primary Examiner* — Marc Norman
(74) *Attorney, Agent, or Firm* — Kilpatrick Townsend & Stockton LLP

(57) ABSTRACT

Methods for controlling temperature in a conditioned enclosure such as a dwelling are described that include an "auto-away" and/or "auto-arrival" feature for detecting unexpected absences which provide opportunities for significant energy savings through automatic adjustment of the setpoint temperature. According to some preferred embodiments, when no occupancy has been detected for a minimum time interval, an "auto-away" feature triggers a changes of the state of the enclosure, and the actual operating setpoint temperature is changed to a predetermined energy-saving away-state temperature, regardless of the setpoint temperature indicated by the normal thermostat schedule. The purpose of the "auto away" feature is to avoid unnecessary heating or cooling when there are no occupants present to actually experience or enjoy the comfort settings of the schedule, thereby saving energy.

21 Claims, 11 Drawing Sheets

(56) References Cited

U.S. PATENT DOCUMENTS

| | | | |
|---|---|---|---|
| 4,335,847 A | 6/1982 | Levine | |
| 4,408,711 A | 10/1983 | Levine | |
| 4,615,380 A | 10/1986 | Beckey | |
| 4,674,027 A | 6/1987 | Beckey | |
| 4,685,614 A | 8/1987 | Levine | |
| 4,751,961 A | 6/1988 | Levine et al. | |
| 4,897,798 A | 1/1990 | Cler | |
| 5,088,645 A | 2/1992 | Bell | |
| 5,211,332 A | 5/1993 | Adams | |
| 5,240,178 A | 8/1993 | Dewolf et al. | |
| 5,244,146 A | 9/1993 | Jefferson et al. | |
| 5,261,481 A * | 11/1993 | Baldwin et al. | 165/237 |
| 5,395,042 A | 3/1995 | Riley et al. | |
| 5,476,221 A | 12/1995 | Seymour | |
| 5,499,196 A | 3/1996 | Pacheco | |
| 5,555,927 A | 9/1996 | Shah | |
| 5,611,484 A | 3/1997 | Uhrich | |
| 5,808,294 A | 9/1998 | Neumann | |
| 5,902,183 A | 5/1999 | D'Souza | |
| 5,909,378 A | 6/1999 | De Milleville | |
| 5,918,474 A | 7/1999 | Khanpara et al. | |
| 5,977,964 A | 11/1999 | Williams et al. | |
| 6,062,482 A | 5/2000 | Gauthier et al. | |
| 6,066,843 A | 5/2000 | Scheremeta | |
| 6,095,427 A | 8/2000 | Hoium et al. | |
| 6,098,893 A | 8/2000 | Berglund et al. | |
| 6,216,956 B1 | 4/2001 | Ehlers et al. | |
| 6,349,883 B1 | 2/2002 | Simmons et al. | |
| 6,356,204 B1 | 3/2002 | Guindi et al. | |
| 6,370,894 B1 | 4/2002 | Thompson et al. | |
| 6,415,205 B1 | 7/2002 | Myron et al. | |
| 6,478,233 B1 | 11/2002 | Shah | |
| 6,645,066 B2 | 11/2003 | Gutta et al. | |
| 6,769,482 B2 | 8/2004 | Wagner et al. | |
| 6,990,821 B2 | 1/2006 | Singh et al. | |
| 7,024,336 B2 | 4/2006 | Salsbury et al. | |
| 7,149,729 B2 | 12/2006 | Kaasten et al. | |
| 7,188,482 B2 | 3/2007 | Sadegh et al. | |
| 7,379,791 B2 | 5/2008 | Tamarkin et al. | |
| RE40,437 E | 7/2008 | Rosen | |
| 7,469,550 B2 | 12/2008 | Chapman, Jr. et al. | |
| 7,644,869 B2 | 1/2010 | Hoglund et al. | |
| 7,702,424 B2 | 4/2010 | Cannon et al. | |
| 7,784,704 B2 | 8/2010 | Harter | |
| 7,802,618 B2 | 9/2010 | Simon et al. | |
| 7,848,900 B2 | 12/2010 | Steinberg et al. | |
| 7,854,389 B2 | 12/2010 | Ahmed | |
| 8,010,237 B2 | 8/2011 | Cheung et al. | |
| 8,019,567 B2 | 9/2011 | Steinberg et al. | |
| 8,037,022 B2 | 10/2011 | Rahman et al. | |
| 8,090,477 B1 | 1/2012 | Steinberg | |
| 8,091,375 B2 | 1/2012 | Crawford | |
| 8,131,497 B2 | 3/2012 | Steinberg et al. | |
| 8,180,492 B2 | 5/2012 | Steinberg | |
| 8,219,249 B2 | 7/2012 | Harrod et al. | |
| 2004/0249479 A1 | 12/2004 | Shorrock | |
| 2004/0262410 A1 | 12/2004 | Hull | |
| 2005/0090915 A1 | 4/2005 | Geiwitz | |
| 2005/0128067 A1 | 6/2005 | Zakrewski | |
| 2005/0189429 A1 | 9/2005 | Breeden | |
| 2005/0192915 A1 | 9/2005 | Ahmed et al. | |
| 2005/0280421 A1 | 12/2005 | Yomoda et al. | |
| 2006/0186214 A1 | 8/2006 | Simon et al. | |
| 2006/0192021 A1 | 8/2006 | Schultz et al. | |
| 2006/0196953 A1 | 9/2006 | Simon et al. | |
| 2007/0045431 A1 | 3/2007 | Chapman, Jr. et al. | |
| 2007/0115902 A1 | 5/2007 | Shamoon et al. | |
| 2008/0015742 A1 | 1/2008 | Kulyk et al. | |
| 2008/0191045 A1 | 8/2008 | Harter | |
| 2008/0273754 A1 | 11/2008 | Hick et al. | |
| 2008/0317292 A1 | 12/2008 | Baker et al. | |
| 2009/0065595 A1 * | 3/2009 | Kates | 236/49.3 |
| 2009/0171862 A1 | 7/2009 | Harrod et al. | |
| 2009/0254225 A1 | 10/2009 | Boucher et al. | |
| 2009/0259713 A1 | 10/2009 | Blumrich et al. | |
| 2009/0297901 A1 | 12/2009 | Kilian et al. | |
| 2009/0327354 A1 | 12/2009 | Resnick et al. | |
| 2010/0019051 A1 | 1/2010 | Rosen | |
| 2010/0025483 A1 | 2/2010 | Hoeynck et al. | |
| 2010/0070084 A1 | 3/2010 | Steinberg et al. | |
| 2010/0070086 A1 | 3/2010 | Harrod et al. | |
| 2010/0070234 A1 | 3/2010 | Steinberg et al. | |
| 2010/0084482 A1 | 4/2010 | Kennedy et al. | |
| 2010/0167783 A1 | 7/2010 | Alameh et al. | |
| 2010/0179704 A1 | 7/2010 | Ozog | |
| 2010/0211224 A1 | 8/2010 | Keeling et al. | |
| 2010/0262298 A1 | 10/2010 | Johnson et al. | |
| 2010/0262299 A1 | 10/2010 | Cheung et al. | |
| 2010/0280667 A1 | 11/2010 | Steinberg | |
| 2010/0289643 A1 | 11/2010 | Trundle et al. | |
| 2010/0308119 A1 | 12/2010 | Steinberg et al. | |
| 2010/0318227 A1 | 12/2010 | Steinberg et al. | |
| 2011/0006887 A1 | 1/2011 | Shaull et al. | |
| 2011/0046792 A1 | 2/2011 | Imes et al. | |
| 2011/0046805 A1 | 2/2011 | Bedros et al. | |
| 2011/0046806 A1 | 2/2011 | Nagel et al. | |
| 2011/0077896 A1 | 3/2011 | Steinberg et al. | |
| 2011/0151837 A1 | 6/2011 | Winbush, III | |
| 2011/0160913 A1 | 6/2011 | Parker et al. | |
| 2011/0185895 A1 | 8/2011 | Freen | |
| 2011/0307103 A1 | 12/2011 | Cheung et al. | |
| 2012/0017611 A1 | 1/2012 | Coffel et al. | |
| 2012/0065935 A1 | 3/2012 | Steinberg et al. | |
| 2012/0085831 A1 | 4/2012 | Kopp | |
| 2012/0158350 A1 | 6/2012 | Steinberg et al. | |
| 2012/0221151 A1 | 8/2012 | Steinberg | |

FOREIGN PATENT DOCUMENTS

| | | |
|---|---|---|
| JP | 59106311 | 6/1984 |
| JP | 01252850 | 10/1989 |

OTHER PUBLICATIONS

Braeburn 5300 Installer Guide, Braeburn Systems, LLC, Dec. 9, 2009, 10 pages.

Braeburn Model 5200, Braeburn Systems, LLC, Jul. 20, 2011, 11 pages.

Ecobee Smart Si Thermostat Installation Manual, Ecobee, Apr. 3, 2012, 40 pages.

Ecobee Smart Si Thermostat User Manual, Ecobee, Apr. 3, 2012, 44 pages.

Ecobee Smart Thermostat Installation Manual, Jun. 29, 2011, 20 pages.

Ecobee Smart Thermostat User Manual, May 11, 2010, 20 pages.

Electric Heat Lock Out on Heat Pumps, Washington State University Extension Energy Program, Apr. 2010, pp. 1-3.

Honeywell Installation Guide FocusPRO TH6000 Series, Honeywell International, Inc., Jan. 5, 2012, 24 pages.

Honeywell Operating Manual FocusPRO TH6000 Series, Honeywell International, Inc., Mar. 25, 2011, 80 pages.

Honeywell Prestige IAQ Product Data 2, Honeywell International, Inc., Jan. 12, 2012, 126 pages.

Honeywell Prestige THX9321 and TXH9421 Product Data, Honeywell International, Inc., 68-0311, Jan. 2012, 126 pages.

Honeywell Prestige THX9321-9421 Operating Manual, Honeywell International, Inc., Jul. 6, 2011, 120 pages.

Hunter Internet Thermostat Installation Guide, Hunter Fan Co., Aug. 14, 2012, 8 pages.

Introducing the New Smart Si Thermostat, Datasheet [online]. Ecobee, Mar. 2012 [retrieved on Feb. 25, 2013]. Retrieved from the Internet: <URL: https://www.ecobee.com/solutions/home/smart-si/>., Mar. 12, 2012, 4 pages.

Lennox ComfortSense 5000 Owners Guide, Lennox Industries, Inc., Feb. 2008, 32 pages.

Lennox ComfortSense 7000 Owners Guide, Lennox Industries, Inc., May 2009, 15 pages.

Lennox iComfort Manual, Lennox Industries, Inc., Dec. 2010, 20 pages.

(56) References Cited

OTHER PUBLICATIONS

Lux PSPU732T Manual, LUX Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc, Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat, Honeywell International, Inc. Operating Manual, Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Allen et al., "Real-Time Earthquake Detection and Hazard Assessment by ElarmS Across California", Geophysical Research Letters, vol. 36, L00B08, 2009, pp. 1-6.
Deleeuw, "Ecobee WiFi Enabled Smart Thermostat Part 2: The Features Review", Retrieved from <URL:http://www.homenetworkenabled.com/content.php?136-ecobee-WiFi-enabled-Smart-Thermostat-Part-2-The-Features-review>, Dec. 2, 2011, 5 pages.
Gao et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.
Loisos et al., "Buildings End-Use Energy Efficiency: Alternatives to Compressor Cooling", California Energy Commission, Public Interest Energy Research, Jan. 2000, 80 pages.
Lu et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.
Mozer, "The Neural Network House: An Environmental that Adapts to Its Inhabitants", AAAI Technical Report SS-98-02, 1998, pp. 110-114.
International Patent Application No. PCT/US2011/061457, International Preliminary Report on Patentability, mailed May 30, 2013, 10 pages.
International Patent Application No. PCT/US2011/061457, International Search Report & Written Opinion, mailed Mar. 30, 2012, 10 pages.
International Patent Application No. PCT/US2012/058206, International Search Report & Written Opinion, mailed Dec. 27, 2013, 13 pages.
International Preliminary Report on Patentability mailed Apr. 22, 2014 for International Patent Application No. PCT/US2012/058206 filed Sep. 30, 2012, 8 pages.

* cited by examiner

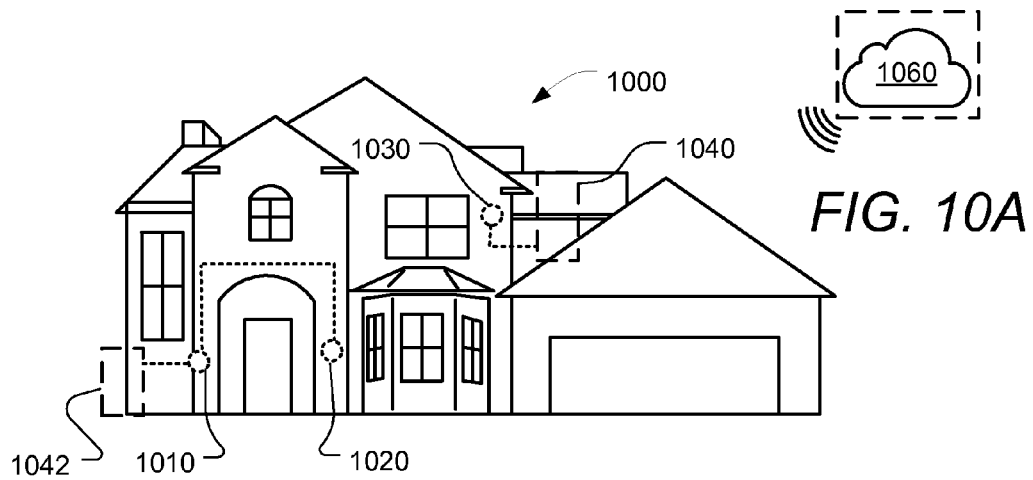
FIG. 10A
FIG. 10B
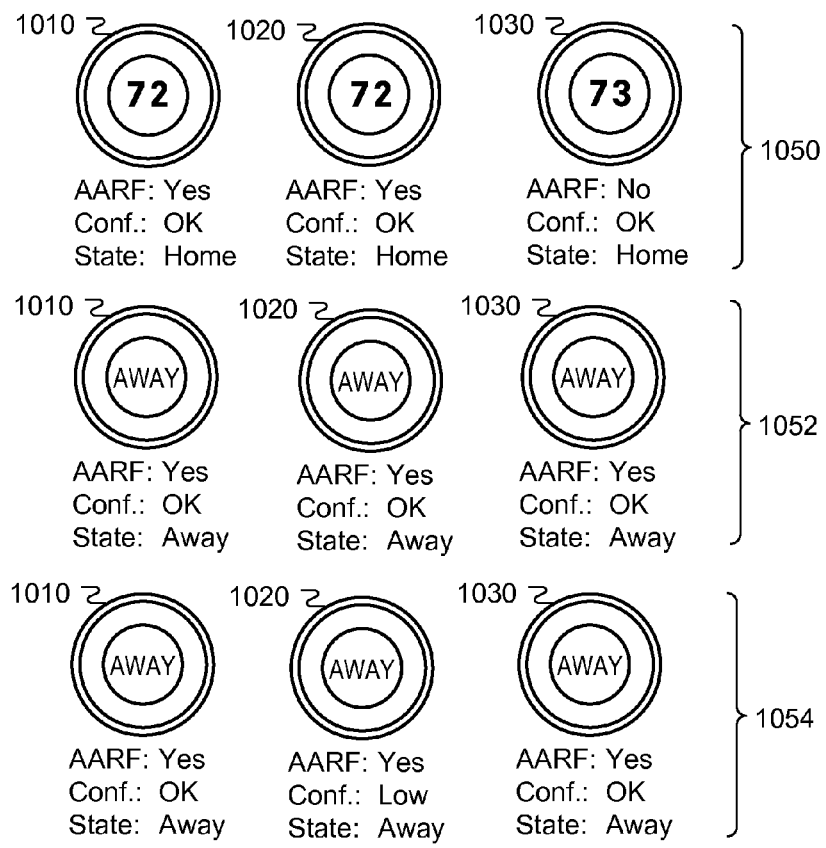

CONTROL UNIT WITH AUTOMATIC SETBACK CAPABILITY

CROSS-REFERENCE TO RELATED APPLICATIONS

This patent application claims the benefit of U.S. Prov. Ser. No. 61/415,771 filed Nov. 19, 2010; and of U.S. Prov. Ser. No. 61/429,093 filed Dec. 31, 2010, each of which is incorporated by reference herein. The subject matter of this patent specification relates to the subject matter of the following commonly assigned applications: U.S. Ser. No. 12/881,430 filed Sep. 14, 2010; U.S. Ser. No. 12/881,463 filed Sep. 14, 2010; U.S. Ser. No. 12/984,602 filed Jan. 4, 2011; U.S. Ser. No. 12/987,257 filed Jan. 10, 2011; U.S. Ser. No. 13/033,573 filed Feb. 23, 2011; U.S. Ser. No. 29/386,021, filed Feb. 23, 2011; U.S. Ser. No. 13/034,666, U.S. Ser. No. 13/034,674 and U.S. Ser. No. 13/034,678 filed Feb. 24, 2011; U.S. Ser. No. 13/038,191 filed Mar. 1, 2011; U.S. Ser. No. 13/038,206 filed Mar. 1, 2011; U.S. Ser. No. 29/399,609 filed Aug. 16, 2011; U.S. Ser. No. 29/399,614 filed Aug. 16, 2011; U.S. Ser. No. 29/399,617 filed Aug. 16, 2011; U.S. Ser. No. 29/399,618 filed Aug. 16, 2011; U.S. Ser. No. 29/399,621 filed Aug. 16, 2011; U.S. Ser. No. 29/399,623 filed Aug. 16, 2011; U.S. Ser. No. 29/399,625 filed Aug. 16, 2011; U.S. Ser. No. 29/399,627 filed Aug. 16, 2011; U.S. Ser. No. 29/399,630 filed Aug. 16, 2011; U.S. Ser. No. 29/399,632 filed Aug. 16, 2011; U.S. Ser. No. 29/399,633 filed Aug. 16, 2011; U.S. Ser. No. 29/399,636 filed Aug. 16, 2011; U.S. Ser. No. 29/399,637 filed Aug. 16, 2011; U.S. Ser. No. 13/199,108, filed Aug. 17, 2011; U.S. Ser. No. 13/267,871 filed Oct. 6, 2011; U.S. Ser. No. 13/267,877 filed Oct. 6, 2011; U.S. Ser. No. 13/269,501 filed Oct. 7, 2011; U.S. Ser. No. 29/399,609 filed Oct. 14, 2011; U.S. Ser. No. 29/399,614 filed Oct. 14, 2011; U.S. Ser. No. 29/399,617 filed Oct. 14, 2011; U.S. Ser. No. 29/399,618 filed Oct. 14, 2011; U.S. Ser. No. 29/399,621 filed Oct. 14, 2011; U.S. Ser. No. 29/399,623 filed Oct. 14, 2011; U.S. Ser. No. 29/399,625 filed Oct. 14, 2011; U.S. Ser. No. 29/399,627 filed Oct. 14, 2011; U.S. Ser. No. 13/275,307 filed Oct. 17, 2011; U.S. Ser. No. 13/275,311 filed Oct. 17, 2011; U.S. Ser. No. 13/317,423 filed Oct. 17, 2011; and U.S. Ser. No. 61/627,996 filed Oct. 21, 2011. Each of the above-referenced patent applications is incorporated by reference herein. The above-referenced patent applications are collectively referenced hereinbelow as "the commonly assigned incorporated applications."

FIELD

This invention relates generally to the monitoring and control of HVAC systems and/or for other systems for controlling household utilities, and/or resources. More particularly, embodiments of this invention relate to systems, methods and related computer program products for facilitating detecting periods of non-occupancy and automatically setting setpoint temperatures using a control device such as a thermostat.

BACKGROUND

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Programmable thermostats have become more prevalent in recent years in view of Energy Star (US) and TCO (Europe) standards, and which have progressed considerably in the number of different settings for an HVAC system that can be individually manipulated. Some programmable thermostats have standard default programs built in. Additionally, users are able to adjust the manufacturer defaults to optimize their own energy usage. Ideally, a schedule is used that accurately reflects the usual behavior of the occupants in terms of sleeping, waking and periods of non-occupancy. Due to difficulty in programming many thermostats, however, may schedules do not accurately reflect the usual behavior of the occupants. For example, the schedule may not account for some usual periods of non-occupancy. Additionally, even when a suitable schedule is programmed into the thermostat, inevitably there are departures from usual behavior. The user can manually set back the thermostat when leaving the house and then resume the schedule upon returning, but many users never or very seldom perform these tasks. Thus an opportunity for energy and cost savings exist if a thermostat can automatically set back the setpoint temperature during time of non-occupancy.

U.S. Patent Application Publication No. 2010/0019051 A1 discusses overriding of nonoccupancy status in a thermostat device based upon analysis or recent patterns of occupancy. The publication discusses a "safety time," for example during the nighttime hours in a hotel or motel room, during which requirements to maintain a condition of occupancy are relaxed based on pattern recognition analysis. A "hysteresis" period of typically less than a few minutes can be built into the motion sensor to establish occupancy for some period after any motion is detected or signaled. An increased hysteresis period can be used during safety times such as during the evening and night hours. The focus is mainly on reliably detecting when occupants return from an absence.

SUMMARY

According to some embodiments a method for controlling temperature in a conditioned enclosure such as a dwelling is described. The method includes controlling temperature within the conditioned space according to a first setpoint, the first setpoint being from a preexisting schedule and representing a temperature suitable when one or more persons are occupying the conditioned space; receiving data reflecting one or more occupancy sensors adapted to detect occupancy within the conditioned enclosure; and automatically changing the setpoint temperature to a second setpoint upon expiration of a predetermined time interval during which no occupancy has been detected, the second setpoint requiring substantially less energy to maintain than the first setpoint.

The predetermined time interval is preferably 60 minutes or greater, and more preferably between about 90 minutes and 180 minutes. According to some embodiments, the predetermined time interval is about 120 minutes. The predetermined time interval can be modified based on prior received data and prior automatic changes of setpoints in the conditioned enclosure, and also based on received manual changes that override prior automatic changes of setpoints.

According to some embodiments, the method can also include automatically changing the setpoint temperature to a third setpoint upon expiration of a second predetermined time interval during which no occupancy has be detected, thus likely indicating occupants are on vacation or other multi-day trip. The third setpoint using substantially less energy to maintain then the second setpoint, and the second time interval can be 24 hours or longer.

As used herein the term "HVAC" includes systems providing both heating and cooling, heating only, cooling only, as well as systems that provide other occupant comfort and/or conditioning functionality such as humidification, dehumidification and ventilation.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the them "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which:

FIG. 10A illustrates an enclosure, such as a family home, which has three thermostats connected to two different HVAC systems, according to some embodiments; and FIG. 10B illustrates examples of implementation of auto-away functionality for multi-thermostat installation settings, according to some embodiments.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Figure 1:
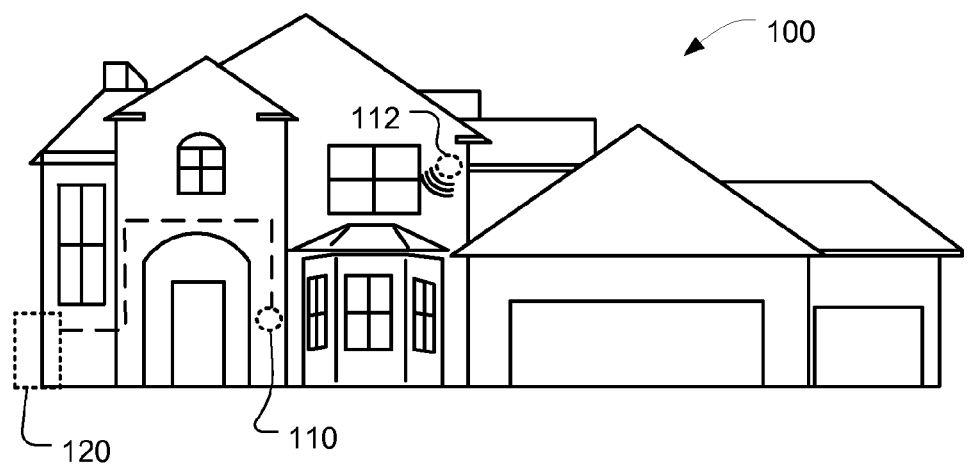
FIG. 1 is a diagram of an enclosure in which environmental conditions are controlled, according to some embodiments.

FIG. 1 is a diagram of an enclosure in which environmental conditions are controlled, according to some embodiments. Enclosure 100, in this example is a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons. According to some embodiments, a remote device 112 wirelessly communicates with the thermostat 110 and can be used to display information to a user and to receive user input from the remote location of the device 112. Although many of the embodiments are described herein as being carried out by a thermostat such as thermostat 110, according to some embodiments, the same or similar techniques are employed using a remote device such as device 112.

Figure 2:
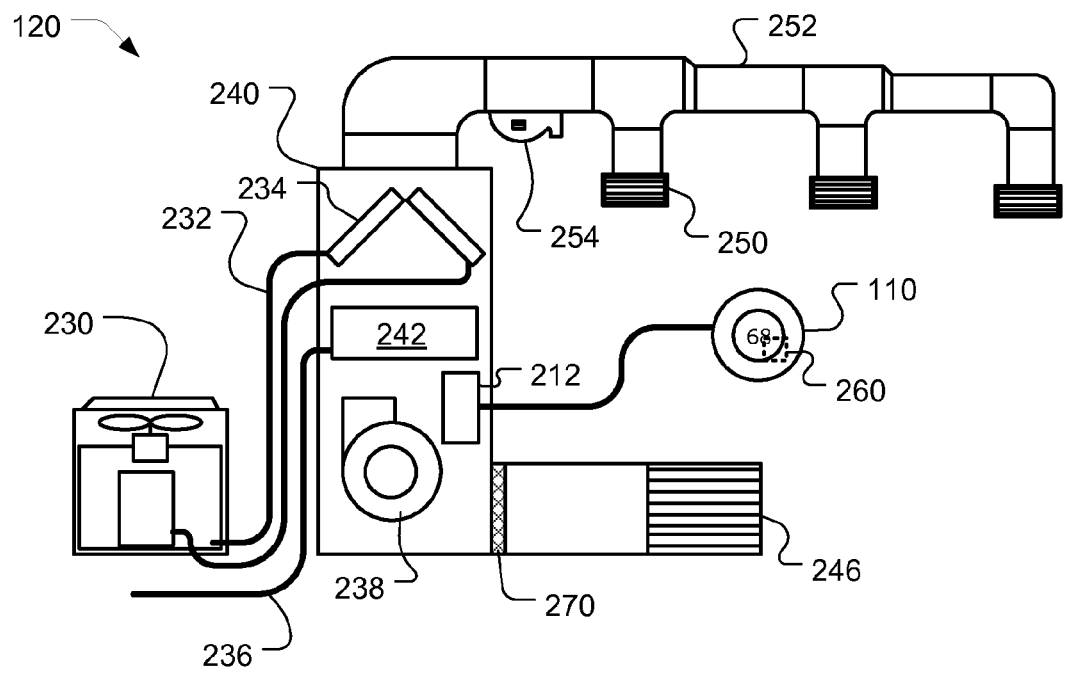
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270, using fan 238 and is heated heating coils or elements 242. The heated air flows back into the enclosure at one or more locations via supply air duct system 252 and supply air grills such as grill 250. In cooling, an outside compressor 230 passes gas such a Freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Although not shown in FIG. 2, according to some embodiments the HVAC system has other known functionality such as venting air to and from the outside, and one or more dampers to control airflow within the duct systems. The system is controlled by algorithms implemented via control electronics 212 that communicate with a thermostat 110. Thermostat 110 controls the HVAC system 120 through a number of control circuits. Thermostat 110 also includes a processing system 260 such as a microprocessor that is adapted and programmed to controlling the HVAC system and to carry out the techniques described in detail herein.

Figure 3A:
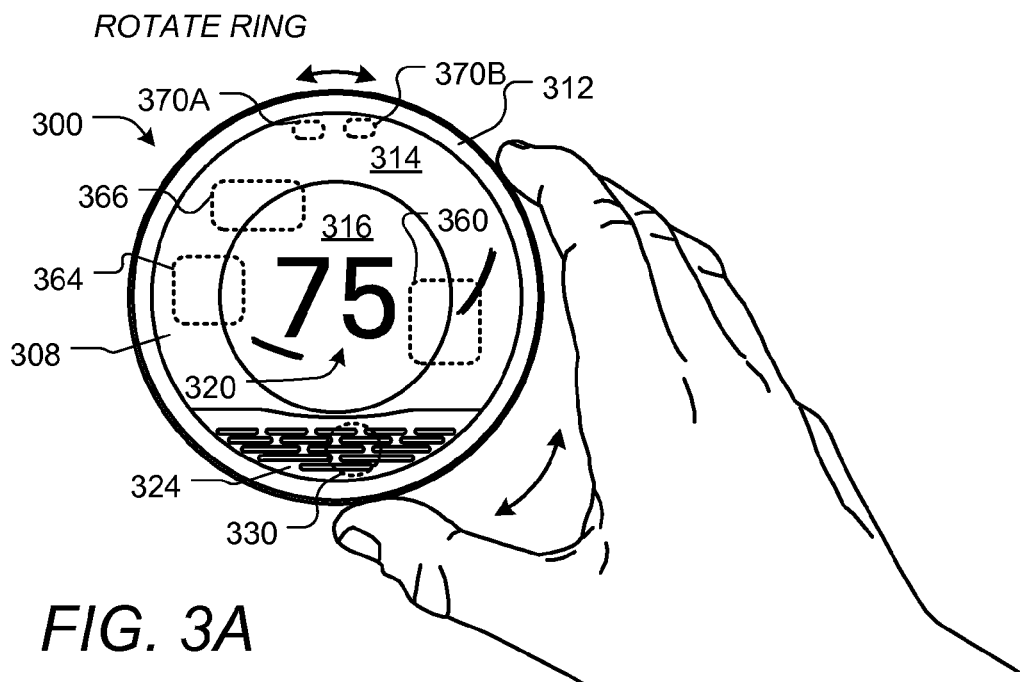
FIGS. 3A-B illustrate a thermostat having a user-friendly interface, according to some embodiments.
Figure 3B:
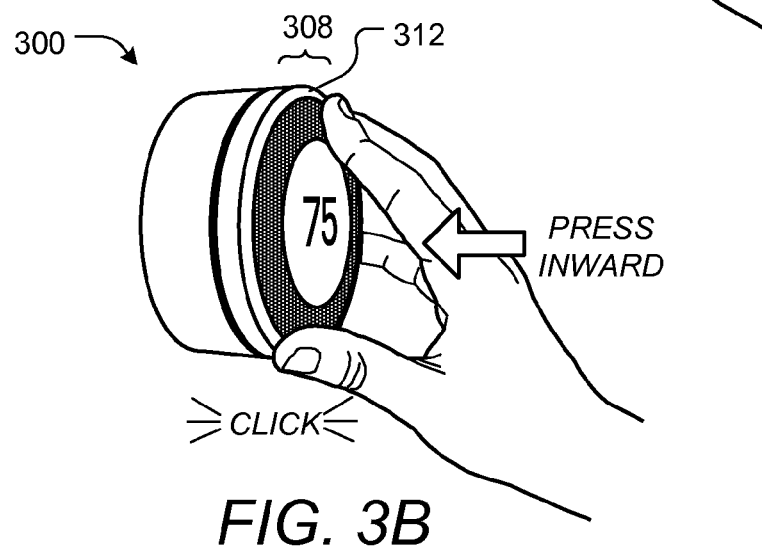

FIGS. 3A-B illustrate a thermostat having a user-friendly interface, according to some embodiments. Unlike so many prior art thermostats, thermostat 300 preferably has a sleek, simple, uncluttered and elegant design that does not detract from home decoration, and indeed can serve as a visually pleasing centerpiece for the immediate location in which it is installed. Moreover user interaction with thermostat 300 is facilitated and greatly enhanced over conventional designs by the design of thermostat 300. The thermostat 300 includes control circuitry and is electrically connected to an HVAC system, such as is shown with thermostat 110 in FIGS. 1 and 2. Thermostat 300 is wall mounted and has circular in shape and has an outer rotatable ring 312 for receiving user input. Thermostat 300 has a large frontal display area 314. According to some embodiments, thermostat 300 is approximately 80 mm in diameter. The outer rotating ring 312 allows the user to make adjustments, such as selecting a new target temperature. For example, by rotating the outer ring 312 clockwise, the target temperature can be increased, and by rotating the outer ring 312 counter-clockwise, the target temperature can be decreased. Within the outer ring 312 is a clear cover 314 which according to some embodiments is polycarbonate. Also within the rotating ring 312 is a metallic portion 324, preferably having a number of windows as shown. According to some embodiments, the surface of cover 314 and metallic portion 324 form a curved spherical shape gently arcing outward that matches a portion of the surface of rotating ring 312.

According to some embodiments, the cover 314 is painted or smoked around the outer portion, but leaving a central display 316 clear so as to facilitate display of information to users. According to some embodiments, the curved cover 314 acts as a lens which tends to magnify the information being displayed in display 316 to users. According to some embodiments central display 316 is a dot-matrix layout (individually addressable) such that arbitrary shapes can be generated, rather than being a segmented layout. According to some embodiments, a combination of dot-matrix layout and segmented layout is employed. According to some embodiments, central display 316 is a backlit color liquid crystal display (LCD). An example of information is shown in FIG. 3A, which are central numerals 320. According to some embodiments, metallic portion 324 has number of openings so as to allow the use of a passive infrared proximity sensor 330 mounted beneath the portion 324. The motion sensor as well as other techniques can be use used to detect and/or predict occupancy, as is described further in co-pending patent application U.S. Ser. No. 12/881,430, which is incorporated by reference herein. According to some embodiments, occupancy information is used in generating an effective and efficient scheduled program. According to some embodiments, proximity and ambient light sensors 370A and 370B are provided to sense visible and near-infrared light. The sensors 370A and 370B can be used to detect proximity in the range of about one meter so that the thermostat 300 can initiate "waking up" when a user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place.

According to some embodiments, for the combined purposes of inspiring user confidence and further promoting visual and functional elegance, the thermostat 300 is controlled by only two types of user input, the first being a rotation of the outer ring 312 as shown in FIG. 3A (referenced hereafter as a "rotate ring" input), and the second being an inward push on the upper cap 308 (FIG. 3B) until an audible and/or tactile "click" occurs (referenced hereafter as an "inward click" input). For further details of suitable user-interfaces and related designs which are employed, according to some embodiments, see co-pending Patent Applications U.S. Ser. No. 13/033,573 and US. Ser. No. 29/386,021, both filed Feb. 23, 2011, and are incorporated herein by reference.

According to some embodiments, the thermostat 300 includes a processing system 360, display driver 364 and a wireless communications system 366. The processing system 360 is adapted to cause the display driver 364 and display area 316 to display information to the user, and to receiver user input via the rotating ring 312. The processing system 360, according to some embodiments, is capable of maintaining and updating a thermodynamic model for the enclosure in which the HVAC system is installed. For further detail on the thermodynamic modeling, see U.S. patent Ser. No. 12/881,463 filed, which is incorporated by reference herein. According to some embodiments, the wireless communications system 366 is used to communicate with devices such as personal computers and/or other thermostats or HVAC system components.

Provided according to some embodiments are algorithms for setpoint schedule departure and/or setpoint schedule modification based on sensed enclosure occupancy and user setpoint modification behaviors. One example of such a setpoint schedule departure algorithm, termed herein an "auto away/auto arrival" algorithm, is described further hereinbelow.

FIGS. 4A-D illustrate time plots of a normal setpoint temperature schedule versus an actual operating setpoint plot corresponding to an exemplary operation of an "auto away/auto arrival" algorithm according to some embodiments. Shown in FIG. 4A, for purposes of clarity of disclosure, is a relatively simple exemplary thermostat schedule 402 for a particular weekday, such as a Tuesday, for a user (perhaps a retiree, or a stay-at-home parent with young children). The schedule 402 simply consists of an awake/at home interval between 7:00 AM and 9:00 PM for which the desired temperature is 76 degrees, and a sleeping interval between 9:00 PM and 7:00 AM for which the desired temperature is 66 degrees. For purposes of the instant description, the schedule 402 can be termed the "normal" setpoint schedule. The normal setpoint schedule 402 could have been established by any of a variety of methods described previously in one or more of the commonly assigned incorporated applications, or by some other method. For example, the normal setpoint schedule 402 could have been established explicitly by direct user programming (e.g., using the Web interface), by setup interview in which the setpoint schedule is "snapped" into one of a plurality of predetermined schedules (e.g., retiree, working couple without kids, single city dweller, etc.), by automated learning, or by any of a variety of other methods.

In accordance with a preferred "auto away" algorithm, an enclosure occupancy state is continuously and automatically sensed using the thermostat's multi-sensing technology, such as the passive infrared proximity sensor 330 shown in FIG. 3A. According to some embodiments the occupancy sensor makes measurements at fairly high frequencies—such as 1-2 Hz. The measurements are then collected into "buckets" of a length of time such as 5 minutes. A simple algorithm is used to determine for each "bucket" whether occupancy is detected or not. For example, if more than two sensor readings in a bucket show detected movement, then the 5 minute "bucket" is regarded as "occupancy detected." Thus, each "bucket" is classified into one of two states: "occupancy detected" or "no occupancy detected." According to some embodiments a certain threshold percentage of readings must indicate movement in order for the bucket to be classified as "occupancy detected." For example, it may be found that even with relatively poor placement, around 10 percent of the readings indicate movement when the conditioned enclosure is occupied. In this example, a threshold of 5 percent may be used to classify the bucket as "occupancy detected."

According to some embodiments, based at least in part on the currently sensed states of the buckets, the thermostat classifies the enclosure or conditioned space into one of four states: "Home" (also known as "occupied"); "Away-Normal" (also known as "unoccupied" or "away intra-day"); "Away-Vacation" (also known as "away inter-day"); and "Sleep." According to some preferred embodiments, when the currently sensed occupancy has been "no occupancy detected" for a predetermined minimum interval, termed herein an away-state confidence window (ASCW), then an "auto-away" feature triggers a changes of the state of the enclosure from "Home" to "Away-Normal." As a result of the state change to "Away-Normal" the actual operating setpoint temperature is changed to a predetermined energy-saving away-state temperature (AST), regardless of the setpoint temperature indicated by the normal thermostat schedule.

The purpose of the "auto away" feature is to avoid unnecessary heating or cooling when there are no occupants present to actually experience or enjoy the comfort settings of the schedule 402, thereby saving energy. The AST may be set, by way of example, to a default predetermined value of 62 degrees for winter periods (or outside temperatures that would call for heating) and 84 degrees for summer periods (or outside temperatures that would call for cooling). Optionally, the AST temperatures for heating and cooling can be user-settable.

The away-state confidence window (ASCW) corresponds to a time interval of sensed non-occupancy after which a reasonably reliable operating assumption can be made, with a reasonable degree of statistical accuracy, that there are indeed no occupants in the enclosure. For most typical enclosures, it has been found that a predetermined period in the range of 90-180 minutes is a suitable period for the ASCW, to accommodate for common situations such as quiet book reading, stepping out to the corner mailbox, short naps, etc. in which there is no sensed movement or related indication for the occupancy sensors to sense.

According to some embodiment the ASCW is automatically adjusted following learning events. For example, according to one embodiment, the ASCW is lengthened by a predetermined amount (e.g. 10-30 minutes) following a manual "punishing" event—i.e. following an change to "Away-Normal" mode, the user manually sets the setpoint temperature to maintain comfort, thus indicating that the enclosure is occupied despite the occupancy detection sensors indicating otherwise. Similarly, according to some embodiments, the ASCW can be shortened upon several repeated switches to "Away-Normal" state in the absence of any manual "punishing" event. Such modification of the ASCW can be used to better adapt the algorithm to the particular tendencies of the occupants and/or the effectiveness of the occupancy sensing due to other factors such as physical placement of the thermostat/sensor.

Figure 4A:
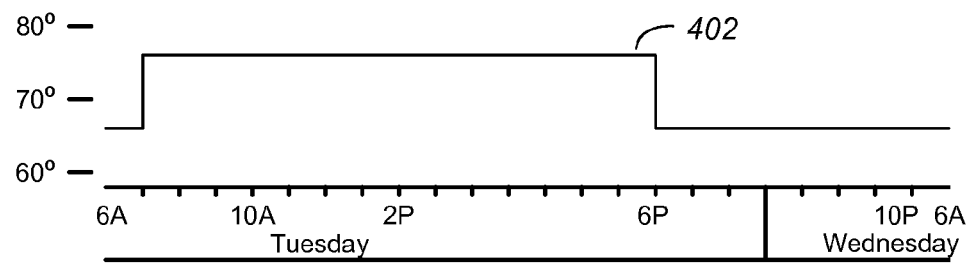
FIGS. 4A-D illustrate time plots of a normal setpoint temperature schedule versus an actual operating setpoint plot corresponding to an exemplary operation of an "auto away/auto arrival" algorithm according to some embodiments.
Figure 4B:
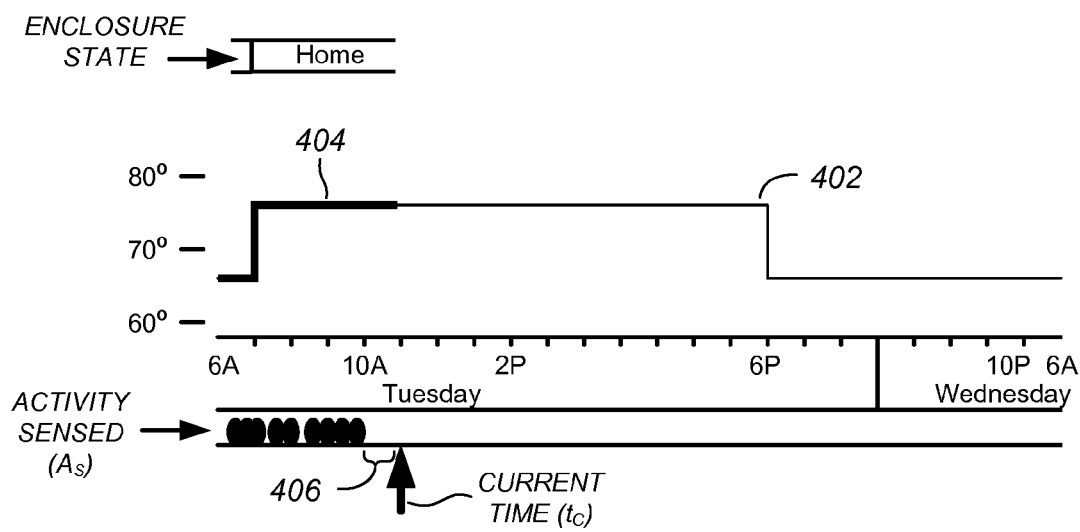

In the example of FIGS. 4A-4D, exemplary description is provided in the context of a heating scenario with an ASCW of 120 minutes, and an AST of 62 degrees, with it to be understood that counterpart examples for cooling and for other ASCW/AST value selection would be apparent to a person skilled in the art in view of the present description and are within the scope of the embodiments. Shown for purposes of illustration in FIG. 4B is the scheduled setpoint plot 402 and actual operating setpoint plot 404, along with a sensed activity timeline ($A_s$) showing small black oval markers corresponding to sensed activity (i.e. the "buckets" of time where occupancy is sensed), that is current as of 11:00 AM. Notably, as of 11:00 AM, there was significant user activity sensed up until 10:00 AM, followed by a one-hour interval 406 of inactivity (or buckets classified as "no occupancy detected"). Since the interval of inactivity in FIG. 4B is only about 1 hour, which is less than the ASCW, the "auto-away" feature does not yet trigger a change of state to the Away-Normal state.

Figure 4C:
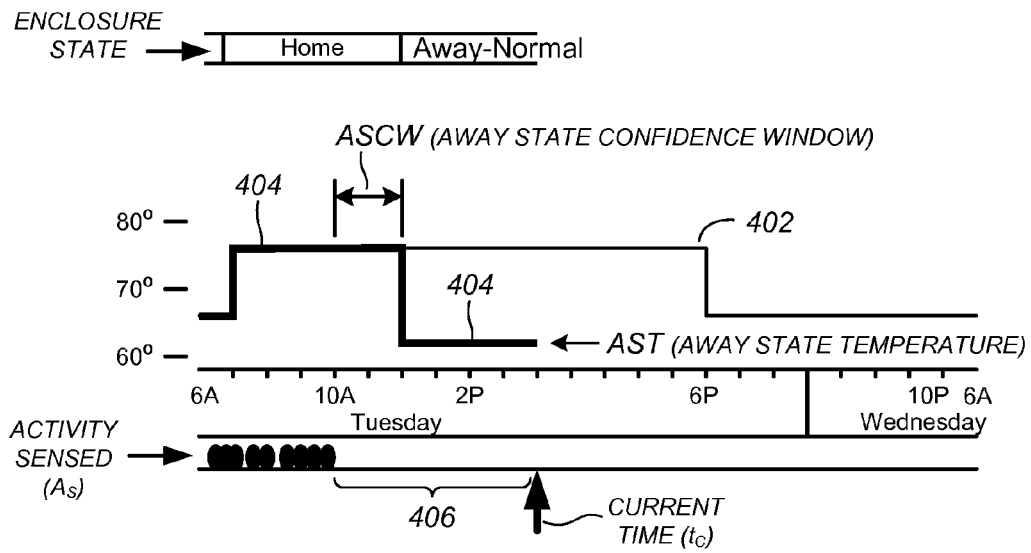

Shown in FIG. 4C are the scheduled and actual setpoint plots as of 4:00 PM. As illustrated in FIG. 4C, an "Away-Normal" mode was automatically triggered at 12:00 PM after 120 minutes of inactivity (120 minutes since the last "occupancy detected" bucket), the actual operating setpoint 404 departing from the normal scheduled setpoint 402 to the AST temperature of 62 degrees. As of 4:00 PM, no activity has yet been sensed subsequent to the triggering of the "Away-Normal" mode, and therefore the "Away-Normal" mode remains in effect.

Figure 4D:
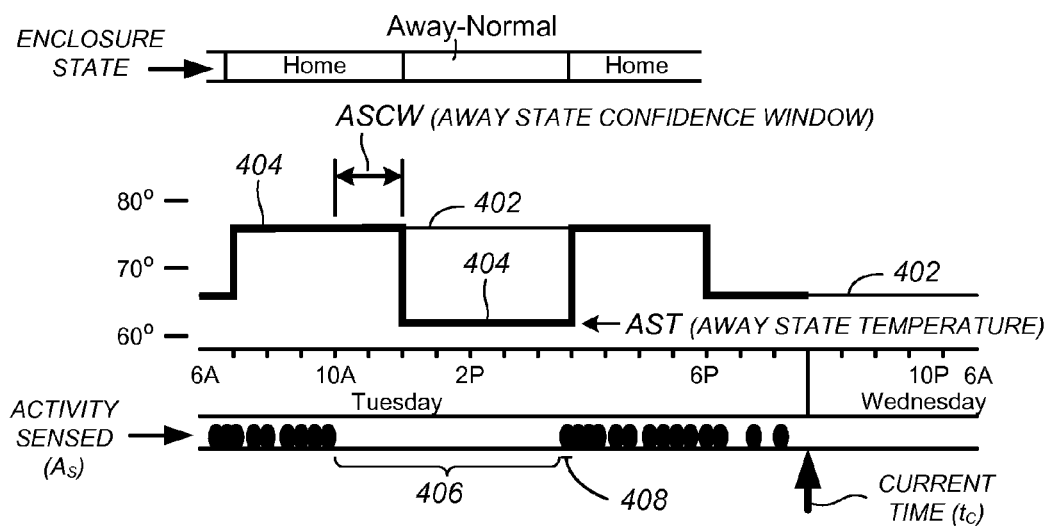

Referring to FIG. 4D the scheduled and actual setpoint plots as of 12:00 AM are shown following the example shown in and described with respect to FIGS. 4A-C. As illustrated in FIG. 4D, occupancy activity started to be sensed for a brief time interval 408 at about 5 PM, which triggered the "auto-return" or "auto-arrival" switching the enclosure to "Home" state, at which point the actual operating setpoint 404 was returned to the normal setpoint schedule 202.

Figure 5:
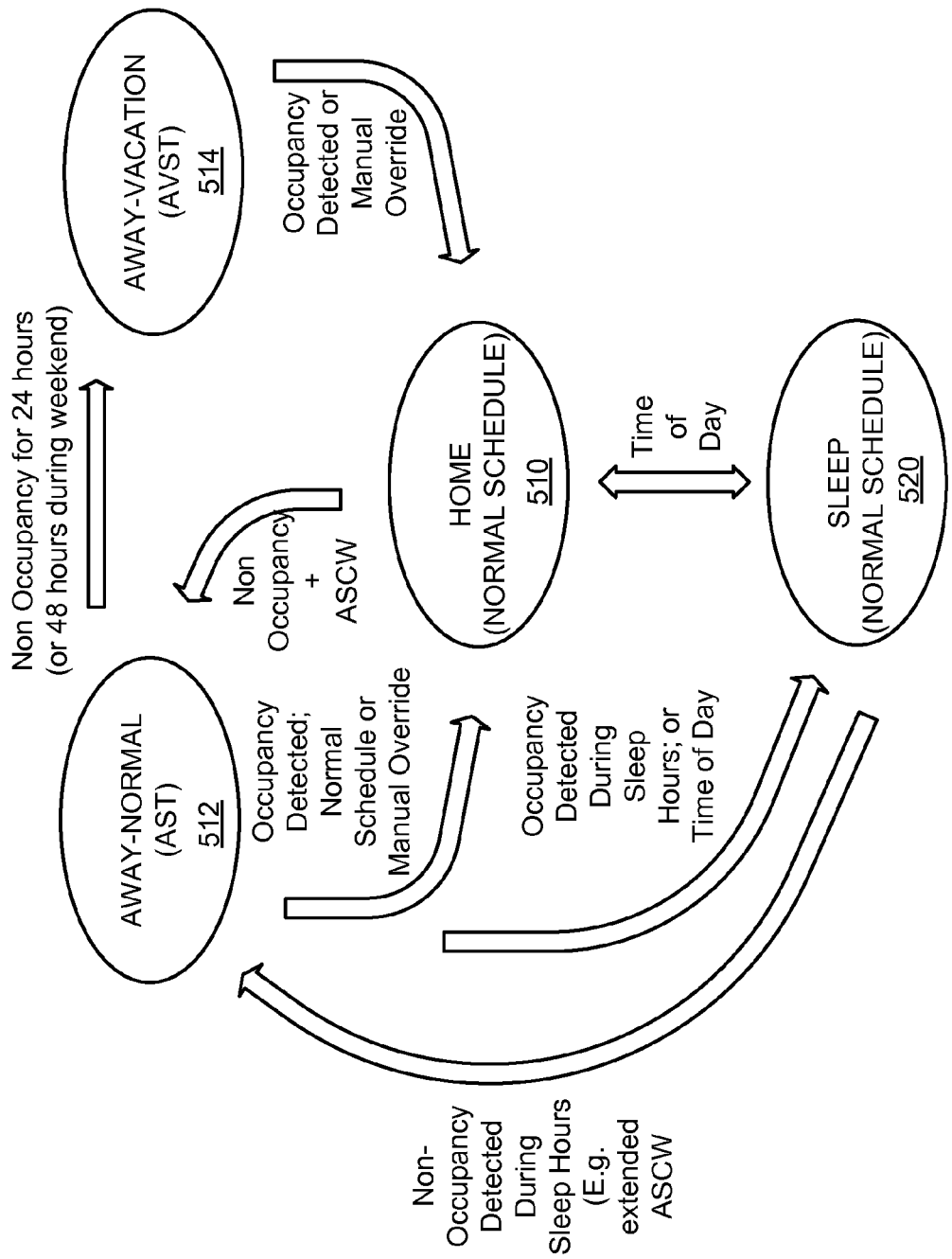
FIG. 5 is a diagram illustrating various states a conditioned enclosure may be classified into, according to some embodiments.

FIG. 5 is a diagram illustrating various states a conditioned enclosure may be classified into, according to some embodiments. The thermostat classifies the enclosure or conditioned space into one of four states: Home (510), also known as "occupied"; Away-Normal (512) also known as "unoccupied" or "away intra-day"; Away-Vacation (514), also known as "away inter-day"; and Sleep (520). During normal operation, the conditioned space is classified as either Home state 510 or the Sleep state 520 according to the time of day and the normal schedule. The Sleep state 520 can be determined by predetermined hours, such as from 12 PM to 6 AM, may be set by the user according to the user's preferences, or may be set according to the current schedule, such as schedule 402 in FIG. 4A which reflects a Sleep state between the hours of 9 PM and 7 AM.

The normal schedule is intended to account for the usual or expected behavior of the occupants. As described, a conditioned enclosure in the Home state 510, can be automatically changed to the Away-Normal state 512 when an unexpected absence is detected in order to save resources and costs. As described, the change from Home state 510 to Away-Normal stat 512 can occur when non-occupancy is detected for the ASCW time period. According to some embodiments, the Away-Normal state 512 mode can be changed based on sensed events, the passage of time, and/or other triggers that are consistent with its essential purpose, the essential purpose being to save energy when no occupants, to a reasonably high statistical degree of probability, are present in the enclosure. For some embodiments, the Away-Normal state 512 maintains the setpoint temperature at the energy-saving AST temperature until one of the following occurs: (i) a manual corrective input is received from the user which changes the state back to the Home state 510; (ii) an "auto-arrival" mode of operation is triggered based on sensed occupancy activity which changes the state back to the Home state 510; (iii) normal occupant sleeping hours have arrived and a determination for a "vacation" mode has not yet been reached, which changes the state to the Sleep state 520; or (iv) the setpoint is changed due to the normal schedule (e.g. the expected and scheduled arrival or waking of the occupants) and a determination for a "vacation" mode has not yet been reached.

According to some embodiments, a conditioned enclosure in the Away-Normal state 512 is changed to an Away-Vacation state 514 if the no-occupancy condition has been sensed for an extended predetermined minimum interval, termed herein as the vacation-state confidence window (VSCW). During the Away-Vacation state 514, the setpoint temperature is set back to the away-vacation setpoint temperature (AVST) which is a relatively extreme energy conserving level. For example, according to one embodiment the AVST is by default 45 degrees F. during time when heating is called for and 95 degrees F. during times when cooling is called for. The VSCW is normally set to be much longer than the ASCW. For example, in many cases a VSCW of 24 hours is appropriate. According to some embodiments, the VSCW is variable, for example being 48 hours of 60 hours during weekend periods from Friday afternoon to Sunday night. A longer VSCW during weekend periods will reduce mistakenly changing the setpoint temperature to the harsh AVST during shorter periods of non-occupancy such as a short weekend trip.

According to some embodiments, during the Sleep state 520, the auto-away feature becomes inactive, i.e. the state will never change directly from Sleep state 520, to Away-Normal state 512. Inactivating the auto-away feature avoids mistakenly changing the setpoint temperature to AST from the nighttime scheduled setpoint temperature when occupancy is not sensed. According to other embodiments, the occupancy sensing algorithm is altered during the Sleep state 520 so as to be less sensitive to inactivity when detecting non-occupancy due to the much lower expected activity level, and different activity patterns and locations during the time when the occupants are sleeping. In one example, the ASCW is simply extended during the Sleep state 520, to 4 hours or 6 hours. According to other embodiments, the threshold percentage of readings in each "bucket" of sensor readings is lowered so as to lower the probability of an erroneous classification of non-occupancy when the occupants are in fact asleep.

Figure 6A:
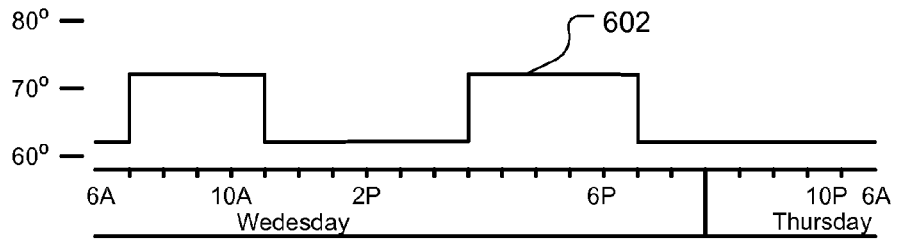
FIGS. 6A-F illustrate time plots of a normal setpoint temperature schedule versus an actual operating setpoint plot corresponding to an exemplary operation of an "auto away/auto arrival" algorithm, according to so some embodiments.

FIGS. 6A-F illustrate time plots of a normal setpoint temperature schedule versus an actual operating setpoint plot corresponding to an exemplary operation of an "auto away/auto arrival" algorithm, according to so some embodiments. Shown in FIG. 6A is a thermostat schedule 602 for a particular weekday, such as a Wednesday, for a user who is not normally home between the hours of 11 AM and 5 PM. The schedule 602 consists of an awake/at home interval from 7:00 AM to 11:00 AM, and again from 5:00 PM to 10:00 PM during which time the setpoint temperature is 72 degrees F. The sleep temperature and the mid-day temperature are both set to 62 degrees F. In this example, the ASCW is 90 minutes, and the AST is 60 degrees. It is to be understood that counterpart examples for cooling and for other ASCW/AST value selection would be apparent to a person skilled in the art in view of the present description and are within the scope of the embodiments.

Figure 6B:
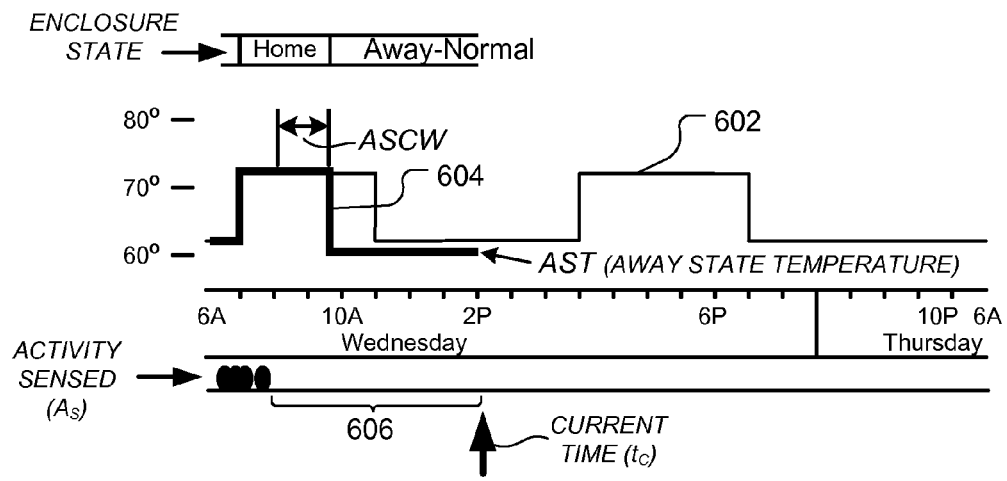

In FIG. 6B, the scheduled setpoint plot 602 is shown along with the actual operating setpoint plot 604. A sensed activity timeline ($A_s$) showing small black oval markers corresponding to sensed activity (i.e. the "buckets" of time where occupancy is sensed), that is current as of 2:00 PM. Notably, as of 2:00 PM, there was significant user activity sensed up until 8:00 AM, followed by an interval 606 of inactivity (or buckets classified as "no occupancy detected"). Upon failure to detect occupancy within the ASCW of 90 minutes, the "auto-away" feature is triggered at 9:30 AM and the state of the conditioned enclosure is set to Away-Normal state, with a setpoint change to the AST of 60 degrees F.

Figure 6C:
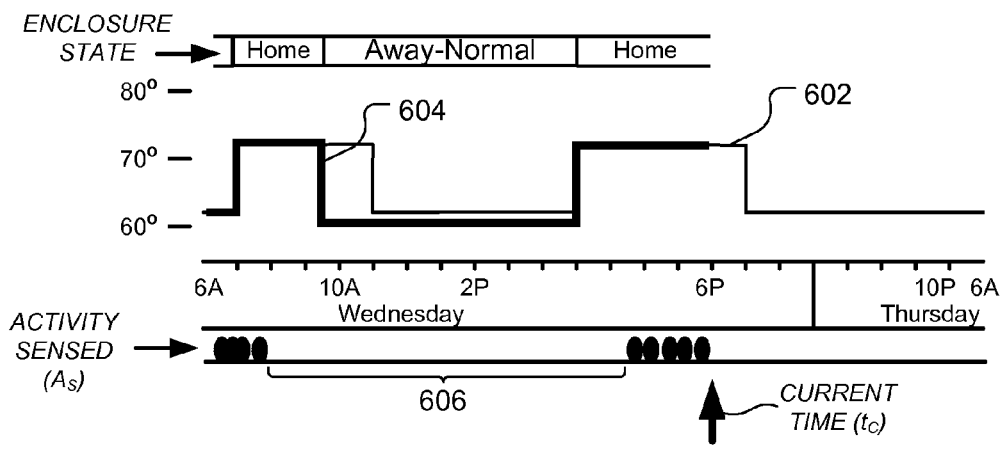

FIG. 6C shows the scheduled and actual setpoint plots 602 and 604, respectively, and sensed activity, that is current as of 9:00 PM. Note that even though no activity was sensed at 5:00 PM the enclosure state was changed to Home, and the setpoint was changed to match the scheduled setpoint of 72 degrees. This switching back to Home or "occupied" state without sensing occupancy is provided since it is expected that the occupants normally arrive home by 5:00 PM as reflected by the schedule 602. Note that in the example shown in FIG. 6C activity was sensed again beginning at about 6:15 PM.

Figure 6D:
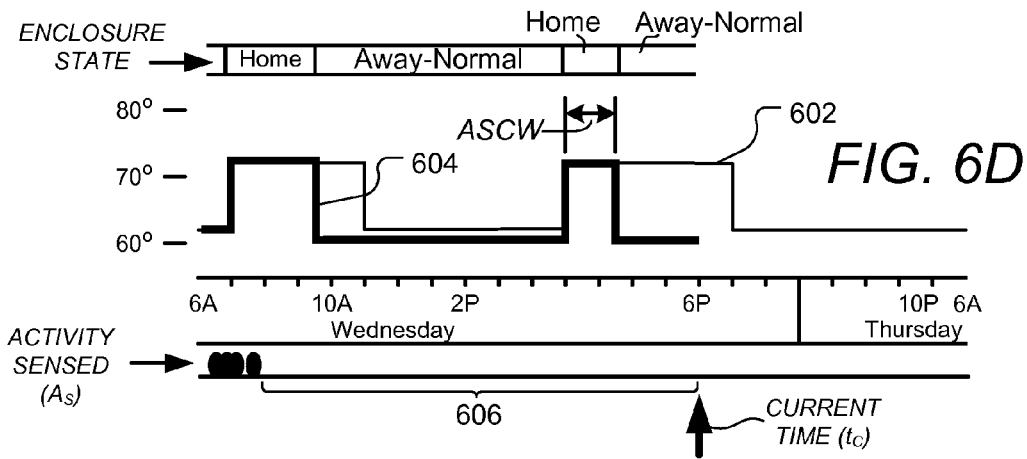

FIG. 6D shows the scheduled and actual setpoint plots 602 and 604, respectively, and sensed activity, that is current as of 9:00 PM, according to a different example. In the example shown in FIG. 6D, no occupancy is detected in the evening through the current time of 9:00 PM. Accordingly after the passage of the ASCW, at 6:30 PM the state of the conditioned enclosure is changed to Away-Normal, and the setpoint is changed to the AST of 60 degrees.

Figure 6E:
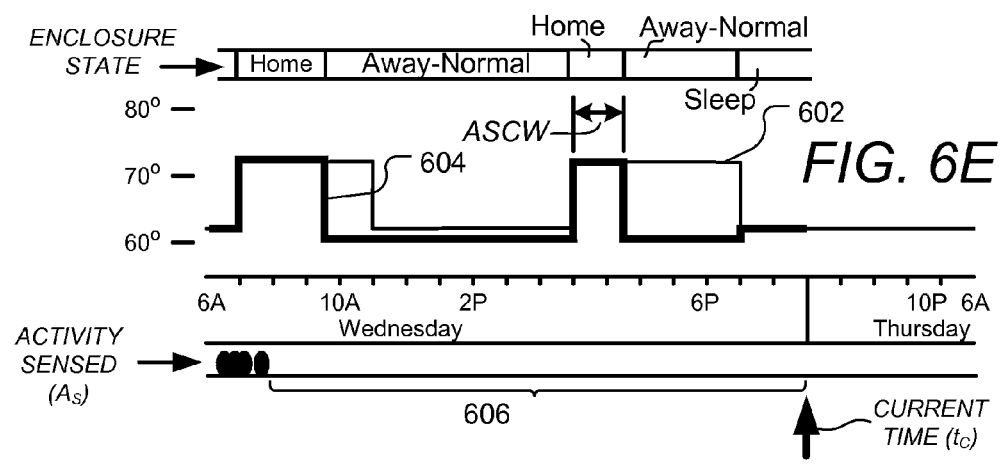

FIG. 6E shows the scheduled and actual setpoint plots 602 and 604, respectively, and sensed activity, that is current as of 12:00 PM, according to the example shown in FIG. 6D. In this example, no occupancy is detected in the evening through the current time of 12:00 PM. At 10:00 PM the scheduled setpoint change is encountered which causes the setpoint of the thermostat to change to the sleep setpoint temperature of 62 degrees. Since 10:00 PM is the start of the Sleep state, according to this example, the auto-away feature becomes inactive.

Figure 6F:
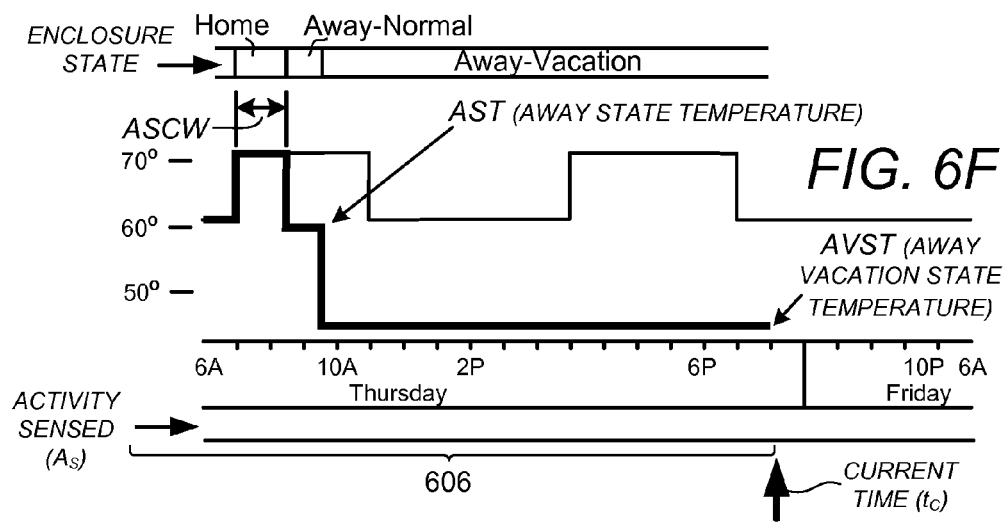

FIG. 6F shows the scheduled and actual setpoint plots 602 and 604, respectively, and sensed activity, that is current as of 11:00 PM on the next day (Thursday), according to the example shown in FIGS. 6D-E. In this example, no occupancy has been detected during the entire period 606 between 8:00 AM Wednesday and 11:00 PM Thursday. In this example, the auto-away feature is simply inactive during the Sleep state between 10:00 PM and 7:00 AM, and the setpoint is increased according to the schedule on Thursday morning at 7:00 AM. However, since no occupancy is detected, the auto-away feature triggers a state change back to Away-Normal following the ASCW passage at 8:30 AM, and the setpoint is changed to the AST. Then, at 9:30 AM the state of the conditioned enclosure is changed to Away-Vacation since 24 hours (the vacation-state confidence window (VSCW)) has passed since the initial change to Away-Normal and no occupancy has been detected in the interim. At 9:30 AM the setpoint is to the AVST (away vacation state temperature), which is 45 degrees F. in this example. Note that according to some embodiments, the VSCW is measured from the last occupancy detected instead of the time of state change to Away-Normal, which would result in changing to Away-Vacation state at 8:00 AM on Thursday.

According to some embodiments, the user is provided with an ability (e.g., during initial setup interview, by the Web interface, etc.) to vary the ASCW according to a desired energy saving aggressiveness. For example, a user who selects a "highly aggressive" energy saving option can be provided with an ASCW of 45 minutes, with the result being that the system's "auto-away" determination will be made after only 45 minutes of inactivity (or "away" or "unoccupied" sensing state).

Various methods for sub-windowing of the ASCW time period and filtering of sensed activity can be used to improve the reliability of the triggering of the "auto-away" feature to change the state to the Away-Normal state. Various learning methods for "understanding" whether sensed activity is associated with human presence versus other causes (pets, for example) can also be used to improve the reliability of the triggering by the "auto-away" feature. According to some embodiments, a "background" level of sensed activity (i.e., activity that can be attributed to sensed events that are not the result of human occupancy) can be interactively learned and/or confirmed based on the absence of corrective manual setpoint inputs during an Away-Normal period. For example, if there are no corrective manual setpoint changes for a period of time following after the "auto-away" mode is triggered, and such absence of corrective input repeats itself on several different occasions, then it can be concluded that the type and/or degree of sensed activity associated with those intervals can be confirmed as being "background" levels not associated with human presence, the reasoning being that if a human were indeed present, there would have been some type of corrective activity on one or more of such occasions.

In a manner similar to the "auto-away" occupancy evaluation, the triggering by the "auto-arrival" feature to the Home state is likewise preferably based on sub-windowed time windows and/or filtering of the sensed activity, such that spurious events or other events not associated with actual human presence do not unnecessarily trigger the "auto-return" mode. As described above, according to some embodiments the sensing process involves separately evaluating 5-minute subwindow "buckets" (or subwindows of other suitable duration) of time in terms of the presence or absence of sensed activity during those subwindows. If it is found that a threshold amount of activity is sensed in two adjacent ones of those time subwindows, then the "auto-arrival" feature triggers a state change back the Home or Sleep state, depending on the time of day. See, for example, the time 408 of FIG. 4D. Upon triggering, the "auto-return" mode operates by returning the setpoint to the normal setpoint schedule 402.

Provided according to one embodiment is an algorithm for setpoint schedule modification based on occupancy patterns and/or corrective manual input patterns associated with repeated instances of "auto-away" triggering and/or "auto-arrival" triggering. Occupancy and/or corrective manual input behaviors associated with "auto-away/auto-arrival" features are continuously monitored and filtered at multiple degrees of time periodicity in order to detect patterns in user occupancy that can, in turn, be leveraged to "trim" or otherwise "tune" the setpoint temperature schedule to better match actual occupancy patterns. By filtering at multiple levels of time periodicity, it is meant that associated patterns are simultaneously sought (i) on a contiguous calendar day basis, (ii) on a weekday by weekday basis, (iii) on a weekend-day by weekend-day basis, (iv) on a day-of-month by day-of-month basis, and/or on the basis of any other grouping of days that can be logically linked in terms of user behavior. Thus, for example, if a particular occupancy and/or corrective manual input behavior associated with "auto-away/auto-arrival" is observed for a series of successive Fridays, then the setpoint temperature schedule for Fridays is adjusted to better match the indicated occupancy pattern. If a particular occupancy and/or corrective manual input behavior associated with "auto-away/auto-arrival" is observed for both a Saturday and Sunday, and then for the next Saturday and Sunday, and then still for the following Saturday and Sunday, then the setpoint temperature schedule for Saturdays and Sundays is adjusted to better match the indicated occupancy pattern detected. As yet another example, if a particular occupancy and/or corrective manual input behavior associated with "auto-away/auto-arrival" is observed for the $2^{nd}$ through $7^{th}$ day of the month for several months in a row, then then the setpoint temperature schedule for the $2^{nd}$ through $7^{th}$ day of the month is adjusted, and so on. According to some preferred embodiments, two "auto away/auto-arrival" events that occur on consecutive similar days (e.g. two consecutive weekdays or on the same days of the week for two consecutive weeks) that (a) are within a predetermined time of day of each other (e.g. within 60 minutes), and (b) are not corrected manually (i.e. there is no associated "punishing" behavior), then the standard schedule will either be automatically modified or the change will be proposed to a user.

Figure 7A:
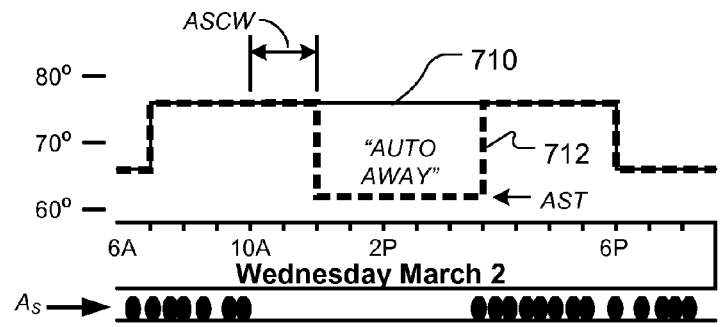
FIGS. 7A-7D illustrate one example of setpoint schedule modification based on occupancy patterns and/or corrective manual input patterns associated with repeated instances of "auto-away" and/or "auto-arrival" triggering according to some embodiments.
Figure 7B:
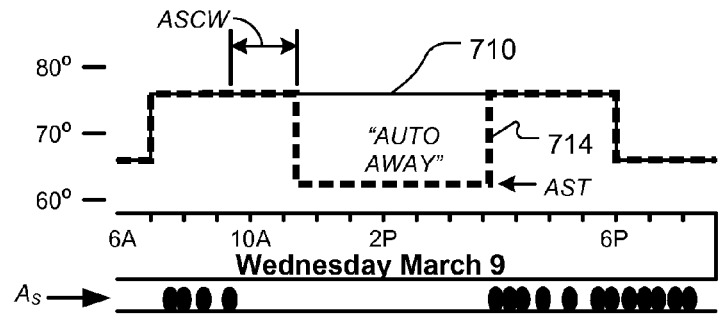
Figure 7C:
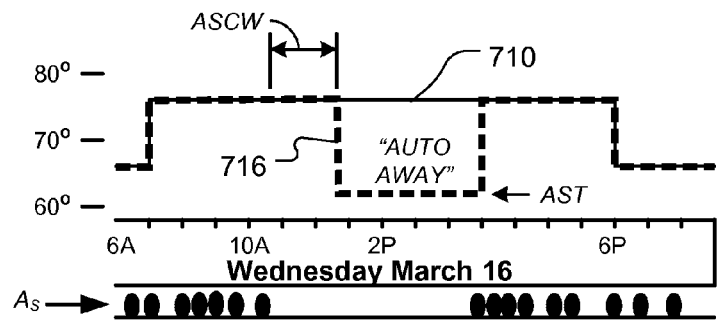
Figure 7D:
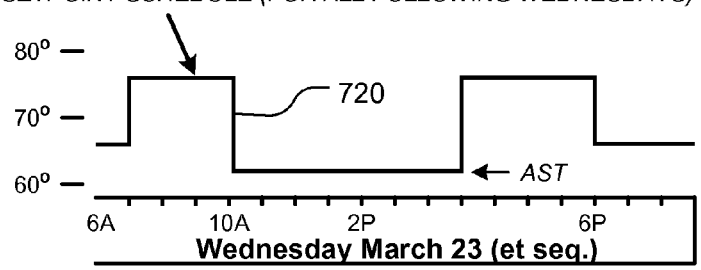

FIGS. 7A-7D illustrate one example of setpoint schedule modification based on occupancy patterns and/or corrective manual input patterns associated with repeated instances of "auto-away" and/or "auto-arrival" triggering according to some embodiments. Plot 710 is the normal setpoint schedule for FIGS. 7A-7C, and plots 712, 714 and 716 show the actual operating setpoint in FIGS. 7A, 7B and 7C respectively. Finally, plot 720 shows the "tuned" or modified setpoint schedule in FIG. 7D. For this example, it is observed over time that, for a user whose normal setpoint temperature indicates they are home all day on weekdays, the "auto-away" feature will trigger the state change to Away-Normal at near noon on Wednesday for multiple weeks (FIGS. 7A-7C) without any corrective manual user inputs, and then the "auto-arrival" mode is triggered near 5:00 PM for those days. This may correspond, for example, to a retiree who has decided to volunteer at the local library on Wednesdays. Once this pattern has been reliably established (for example, after having occurred three Wednesdays in a row), then as illustrated in FIG. 7D, the normal setpoint temperature schedule is automatically "tuned" or "trimmed" such that, for the following Wednesday and all Wednesdays thereafter, there is an "away" period scheduled for the interval between 10:00 AM and 5:00 PM, because it is now expected that the user will indeed be away for this time interval.

According to some embodiments, a pattern is reliably established by two consecutive events (e.g. based only two of the three Wednesdays in FIGS. 7A-C, instead of all three Wednesdays). Further according to some embodiments, the "tuned" or modified schedule 720 is not automatically adapted, but rather is proposed to a user. This can be performed, for example, in cases where the user has indicated a preference to be "asked" about updated schedules, rather than have them automatically adopted. According to some other embodiments, the new schedule 720 is only adopted automatically or proposed to a user in cases there a estimated cost and/or energy saving is above a predetermined threshold or percentage.

Importantly, if there had occurred a corrective user input (which can be called a "punishing" user input) on one of the days illustrated in FIGS. 7A-7C, then the setpoint schedule is not automatically "tuned" to that shown in FIG. 7D. Such corrective or "punishing" input could occur for circumstances in which (i) the auto-away mode has been triggered, (ii) there is not enough sensed occupancy activity (after filtering for "background" events) for the "auto-arrival" feature to trigger a state change, and (iii) the user is becoming uncomfortable and has walked up to the thermostat to turn up the temperature. By way of example, it may be the case that instead of going to the library on Wednesday at 10:00 AM, the user went upstairs to read a book, with a sole first-floor thermostat not sensing their presence and triggering auto-away at 12:00 PM, the user then becoming uncomfortable at about 12:45 PM and then coming downstairs to manually turn up the temperature. Because the user's "punishing" input has made it clear that the algorithm is "barking up the wrong tree" for this potential pattern, the setpoint schedule is not automatically "tuned" to plot 720 as shown in FIG. 7D, and, in one embodiment, this potential pattern is at least partially weighted in the negative direction such that an even higher degree of correlation will be needed in order to establish such pattern in the future. Advantageously, for the more general case, the user's "punishing" inputs may also be used to adjust the type and/or degree of filtering that is applied to the occupancy sensing algorithms, because there has clearly been an incorrect conclusion of "inactivity" sensed for time interval leading up to the "punishing" corrective input.

Whereas the "auto away/auto arrival" algorithm of the above-described embodiments is triggered by currently sensed occupancy information, in another embodiment there is provided automated self-triggering of "auto away/auto arrival" algorithm based on an empirical occupancy probability time profile that has been built up by the thermostat unit(s) over an extended period of time. For one embodiment, the empirical occupancy probability time profile can be expressed as a time plot of a scalar value (an empirical occupancy probability or EOP) representative of the probability that one or more humans is occupying the enclosure at each particular point in time. Any of a variety of other expressions (e.g., probability distribution functions) or random variable representations that reflect occupancy statistics and/or probabilities can alternatively be used rather than using a single scalar metric for the EOP.

For one embodiment, the thermostat unit is configured to self-trigger into an Away-Normal state at one or more times during the day that meet the following criteria: (i) the normal setpoint schedule is indicative of a scheduled "at home" time interval, (ii) the empirical occupancy probability (EOP) is below a predetermined threshold value (e.g., less than 20%), (iii) the occupancy sensors do not sense a large amount of activity that would unambiguously indicate that human occupants are indeed present in the enclosure, and (iv) the occupancy sensors have not yet sensed a low enough level of activity for a sufficiently long interval (i.e., the away-state confidence window or ASCW) to enter into the "auto away" mode in the "conventional" manner previously described. Once these conditions are met and the "auto-away" mode has been self-triggered, reversion out of the "auto away" mode can proceed in the same manner (e.g., by "auto-arrival" triggering, manual corrective user input, etc.) as for the "conventional" auto-away mode. Automated tuning of the setpoint temperature schedule based on the "lessons learned" (i.e., based on occupancy patterns and/or corrective manual input patterns associated with repeated instances of "auto-away" mode) can be based on the combined observations from the "conventionally" triggered auto-away mode and the self-triggered auto-away mode algorithms.

The above-described self-triggering of the "auto-away" mode, which is based at least in part on empirical occupancy probability (EOP), has been found to provide for more complete and more statistically precise "tuning" of the setpoint temperature schedule when compared to tuning that is based only on the "conventional" auto-away triggering method in which only current, instantaneous occupancy information is considered. One reason relates to the large number of activity-sensing data samples used in generating the EOP metric, making it a relevant and useful basis upon which to perform the occupancy "test" afforded by the "auto-away" process. From one perspective, the "auto-away" process can be thought of as a way to automatically "poke" or "prod" at the user's ecosystem to learn more detail about their occupancy patterns, without needing to ask them detailed questions, without needing to rely on the correctness of their responses, and furthermore without needing to rely exclusively on the instantaneous accuracy of the occupancy sensing hardware.

Figure 8:
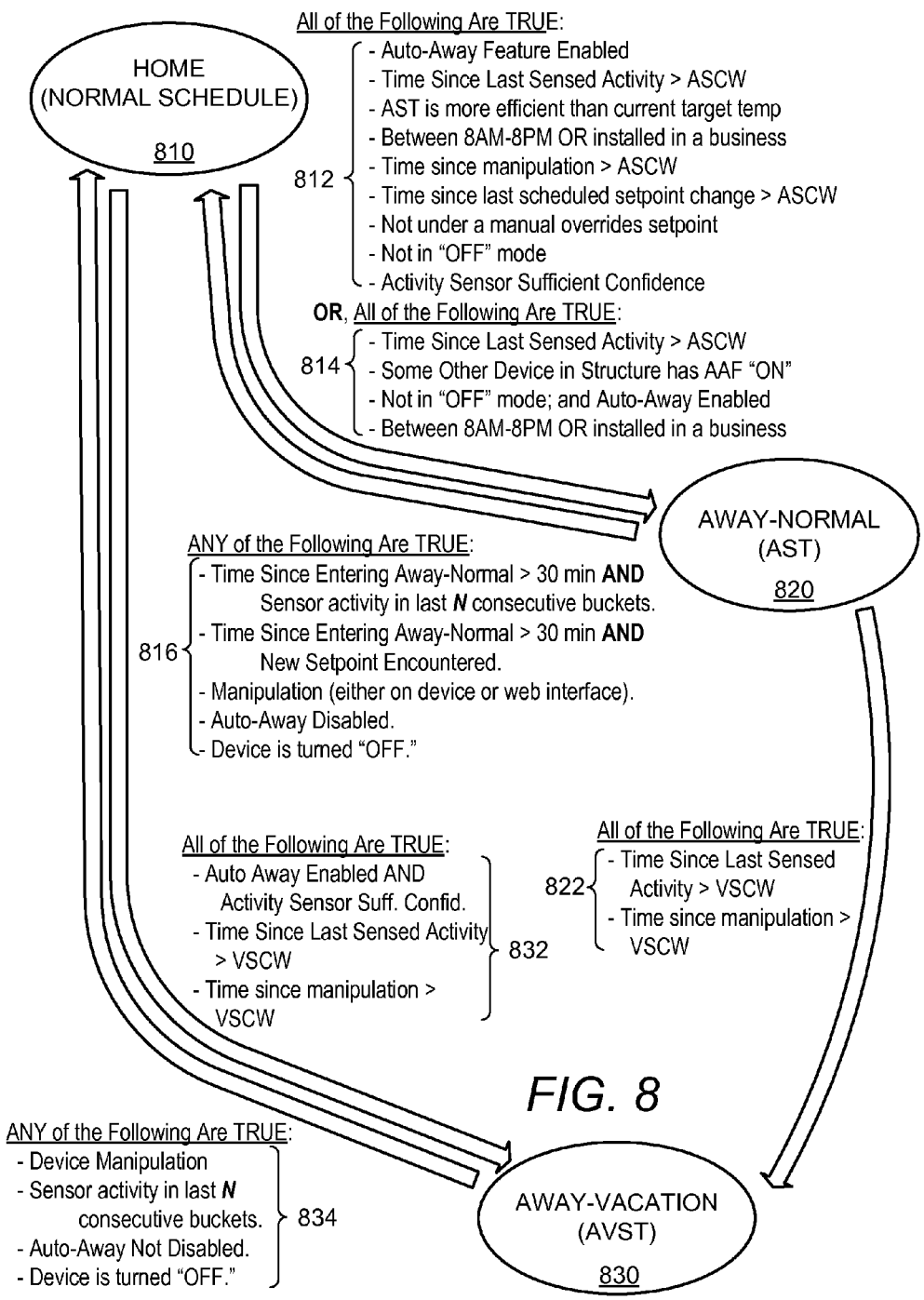
FIG. 8 is a diagram illustrating various states a conditioned enclosure may be classified into, according to some preferred embodiments.

FIG. 8 is a diagram illustrating various states a conditioned enclosure may be classified into, according to some preferred embodiments. The embodiments of FIG. 8 represent one or more features of an auto-away/auto-arrival algorithm that can be used as an alternative to, or in some cases in conjunction with, the embodiments described with respect to FIG. 5, supra. Notably, there is no separate "Sleep" state for the embodiment of FIG. 8, although the scope of the present teachings is not so limited. Instead of having a separate "Sleep" state, there is provided a condition for entering into an Away-Normal state 820 that the time of day is not between 8 PM and 8 AM if the conditioned enclosure is not a business. The state will transition from Away-Normal state 820 to Home state 810 for non-businesses during the hours of 8 PM and 8 AM.

Shown in FIG. 8 are three states: Home state 810, in which the thermostat generally follows a scheduled program (unless, for example, it is under a manual override setpoint); Away-Normal state 820 (which can also be referred to as "intra-day away" and/or "intra-day auto-away" states in the description herein) during which the setpoint temperature is set to an energy saving level, such as the AST; and Away-Vacation state 830 (which can also be referred to as "inter-day away" and/or "inter-day auto-away" states) during which the setpoint temperature is set to an energy saving level such as the AVST. According to some embodiments, the AST and the AVST are set to the same temperature for simplicity. Depending on the particular manner in which state of the enclosure has transitioned into the "Home" state 810, the "Home" state 810 can alternatively be referred to as an "arrival" state, or an "auto-arrival" state (the thermostat entered back into a "home" state by virtue of sensed occupancy activity), or a "manual arrival" state (the thermostat entered back into a "home" state because it was physically manipulated by a walk-up user, or the current setpoint temperature was changed by a remote user using a cloud-based remote control facility).

According to some embodiments, transitioning from the Home state 810 to the Away-Normal state 820 can happen if either (i) all of a first set of conditions 812 are met, or (ii) all of a second set of conditions 814 are met. The conditions 812 include that the Auto-away feature is enabled, and the time since the last sensed activity is greater than the ASCW, which according to some embodiments is initially set to 120 minutes. According to some embodiments, the activity sensor data is "collected" into timewise "buckets," and the algorithm will look for a number of consecutive empty buckets to make a determination that that there is no sensed occupant activity. According to some preferred embodiments, the buckets are 5 minutes in duration and the ASCW is initially implemented as being equal to 24 buckets (which corresponds to about 2 hours). However, according some embodiments other sizes of buckets, and numbers of buckets can be used, or other schemes of detecting occupancy (or non-occupancy) can be implemented.

The conditions 812 also include the away setpoint temperature being at least as efficient as the setpoint temperature currently in effect, since otherwise moving to an "Away" state would not conserve energy. As stated previously, the conditions for entering intra-day auto-away from a "Home" state further include that the time of day should be between 8 AM and 8 PM (or other suitable "non-sleep" time interval) for a residential installation. No such limitation is used for business installations, since occupant sleep is usually not an issue, and therefore entry into an energy-saving "Away" state for those hours is highly beneficial if there is no sensed activity. Conditions 812 further include a condition that the time since a most recent manipulation should be less than the ASCW, where "manipulation" refers to either a manual walk-up interaction with the thermostat (such as rotating the ring/dial or an inward click), or an interaction via a remote web and/or PC interface that takes the thermostat out of the away state. Take, for example, a scenario in which an occupant leaves their dwelling at 9:00 AM, and goes to work in an office. At the office, the user logs in remotely (either directly to the thermostat or via a cloud-based server as discussed in one or more of the commonly assigned incorporated applications) and makes a change to some thermostat settings at 10:00 AM. Assuming the other of conditions 812 to have been satisfied starting at 11:00 AM (9:00 AM plus the 2-hour ASCW), the Away-Normal state 820 will actually not be entered until Noon (10:00 AM plus the 2 hour ASCW) rather than at 11:00 AM, due to the "manipulation" (by web interface) that took place at 10:00 AM.

The conditions 812 also include that the time since the last scheduled setpoint change (or the most recently "encountered" scheduled setpoint change) is greater than the ASCW. For example, if the occupants leave the dwelling at 5 PM, and there is a scheduled setpoint change at 6 PM, and the ASCW is 2 hours, then an Away state will not be entered until at least 8 PM instead of 7 PM. The conditions 812 also include that, if the thermostat is operating according to a manual override, i.e., the user has walked up to the thermostat and adjusted the current setpoint temperature by rotating the dial (as opposed to scheduling a setpoint using a scheduling facility), or has performed an equivalent action over the remote network interface, the auto-away state will not be entered as long as that manual override setpoint is in effect. Notably, according to some embodiments, any manual override will stay in effect until the next scheduled setpoint is encountered. One example where this condition can be useful is if a user is home sick from work, and so manually turns up the dial from the usual scheduled setpoint temperature. Assuming there are no scheduled setpoints that take effect during the day, this manual override will last until the end of the working day, when there will usually be a scheduled setpoint that raises the temperature, thereby taking the manual override out of effect. Advantageously, due to this no-manual-override condition, the Auto-Away mode will not take effect during this day when the user is home sick and has manually turned up the dial before going back to bed. The conditions 812 also include that the thermostat should not be in the "OFF" mode. Another of the conditions 812 is that, if the thermostat does not yet have enough "confidence" that its occupancy sensors are producing sufficiently reliable occupancy data, as described in one or more of the commonly assigned incorporated applications, then the Away-Normal state 820 will not be entered. This can be the case, for example, if the thermostat 300 has been installed in a place in the home that cannot "see" occupant activity very well, such as if it has been placed behind a bookshelf, or at the end of a dead-end hallway that does not receive much traffic. By automatically processing sensor data over a period of time after installation, and comparing this data to other information such as times of day and manual walk-up user dial interactions, the thermostat 300 is advantageously capable of "disqualifying itself" due to "low sensor confidence" from the described auto-away activities if it is determined that it will not be able to reliably draw a line between inactivity and occupant activity.

The conditions 814 pertain to the situation where there are multiple thermostats installed in the same structure, which will be described in further detail below. Preferably, as will be discussed in further detail, all of the installed thermostats should "agree" before moving to an Away state. If there is another thermostat in the structure which has an auto-away flag (AAF) set to "ON" then the thermostat will also set its AAF to "ON" so long as this thermostat itself has not sensed any activity within the ASCW, it is not turned "OFF," auto-away is enabled, and the time is not between 8 PM and 8 AM (if a non-business structure). Notably, according to some embodiments, the current thermostat will not interfere with another thermostat's decision to move into an Away state even if the current thermostat has low sensor confidence, for example.

Referring now again to FIG. 8, once the thermostat has entered into an intra-day auto-away state (Away Normal state 820), it will remain in that state until either (i) a first set of conditions 816 are met, in which case it will transition back to the "Home" state 810, or (ii) a second set of conditions 822 are met, in which case it will transition to an away-vacation state 830. For transitioning back to "Home" from intra-day auto-away, the conditions 816 include an "auto-arrival" determination. One condition that has been found particularly useful for a variety of different reasons implements a kind of "latch" mechanism for the intra-day auto-away state, such that when the thermostat switches over into the intra-day auto-away state, it is "latched" into that state for a certain period of time and will not return to the "Home" state even if there would otherwise be an auto-arrival determination, this certain period of time being termed herein an auto-arrival inhibition window (AAIW). If the time since entering the Away-Normal state 820 is within the auto-arrival inhibition window (AAIW) as will be described in further detail with respect to FIG. 9, the state will remain in the Away-Normal state 820 even though activity is sensed and/or a scheduled setpoint is encountered. The AAIW according to some embodiments, is set to 30 minutes. If the AAIW has passed, then sensor activity in N consecutive buckets will cause a return to the Home state 810. The value of N, according to some embodiments, can be adjusted to make the auto-arrival function more or less sensitive to detected activity. According to some embodiments the value of N is initially set to two, such that if there is sensed activity for two consecutive buckets then an auto-arrival occurs. If the AAIW has passed, then an encountered scheduled setpoint will also cause an auto-arrival. A walk-up manual interaction with the thermostat (such as by rotating the ring or inward clicking) and/or a remote access manual interaction, such as through a remote access network facility, can also take the thermostat out of the Away-Normal state 820 and back to Home state 810. Finally, the thermostat will return to the Home state 810 if either the auto-away feature is disabled or the thermostat is turned "OFF." It is to be appreciated that the described auto-away and auto-arrival functionalities of FIGS. 4A-10B are preferably provided in conjunction with an independent "manual away" and "manual arrival" functionality of the thermostat 300. For some embodiments, as described in one or more of the commonly assigned incorporated applications, there is provided an ability for the user to directly and instantly invoke an "Away" mode, either by walking up to the thermostat dial and selecting "Away" on a menu, or by selecting an "Away" button or menu choice using the remote access facility. For such case, which can be termed a "manual away" mode, in some embodiments the thermostat operates continuously and perpetually at the energy-saving AST (away state temperature) regardless of what the schedule would otherwise dictate, and regardless of any sensed occupant activity, until such time as the user manually takes the thermostat out of the "manual away" mode by virtue of a "manual arrival." For some embodiments, a "manual arrival" is achieved simply by walking up to the dial and giving any type of input (such as by rotating the ring or inward clicking), or by doing any kind of interaction upon logging into the remote network access facility.

Referring now again to FIG. 8, the thermostat can transition from the Away Normal state 820 to the Away-Vacation state 830 if all of the conditions 822 are met. To move to the Away-Vacation state 830, the time since the last sensed activity (or the last non-empty bucket) should be greater than the VSCW, which according to some preferred embodiment is 2 days (or 48 hours). Also, the time since the last manipulation (i.e. via user interaction of rotating ring and/or inward click) should also be greater than the VSCW.

According to some embodiments, transitioning from the Home state 810 directly to the Away-Vacation state 830 can happen if all of the conditions 832 are met. Note that in many cases, the Away-Vacation state 830 will be entered from the Away-Normal state 820 rather than from the Home state 810. In other cases, however, the thermostat state can move directly to the Away-Vacation state from the Home state. Thus, for example, in a typical simple situation in which there are four scheduled setpoints per day (representing wake, work, evening, and sleep, for example) but the user has left on vacation, the thermostat will transition between "Away-Normal" and "Home" for the first day or two, transitioning from "Away-Normal" back to "Home" for each scheduled setpoint and then returning to Away-Normal after each ASCW (e.g., 2 hours) has expired, until the VSCW is reached. If the thermostat happens to be in "Home" mode at the time the VSCW is reached, then the transition is directly from "Home" to "Away-Vacation," whereas if the thermostat happens to be in "Away-Normal" mode at the time the VSCW is reached, then the transition is directly from "Away-Normal" to "Away-Vacation." Notably, if there are very frequent scheduled setpoint changes (more frequent than the ASCW, such as one setpoint per hour) then the Away-Normal state may never be entered, and the thermostat will go directly from "Home" to "Away-Vacation" when the VSCW is reached. Conditions 832 dictate that, to move from "Home" state 810 to the Away-Vacation state 830, the auto-away function must be enabled and the activity sensors should have sufficient confidence. Additionally, as in the case of conditions 822, the time since the last sensed activity (or the last non-empty bucket) and the time since the last manipulation (i.e. via user interaction of rotating ring and/or inward click) should be greater than the VSCW.

According to some embodiments, transitioning from the Away-Vacation state 830 back to the Home state 820 can happen if any of the conditions 834 are met. The conditions 834 include any manual manipulation of the thermostat (walk-up or web), sensing of activity in N consecutive buckets (for example 2 buckets of 5 minutes each), or when auto-away is disabled or the thermostat is turned off.

Figure 9:
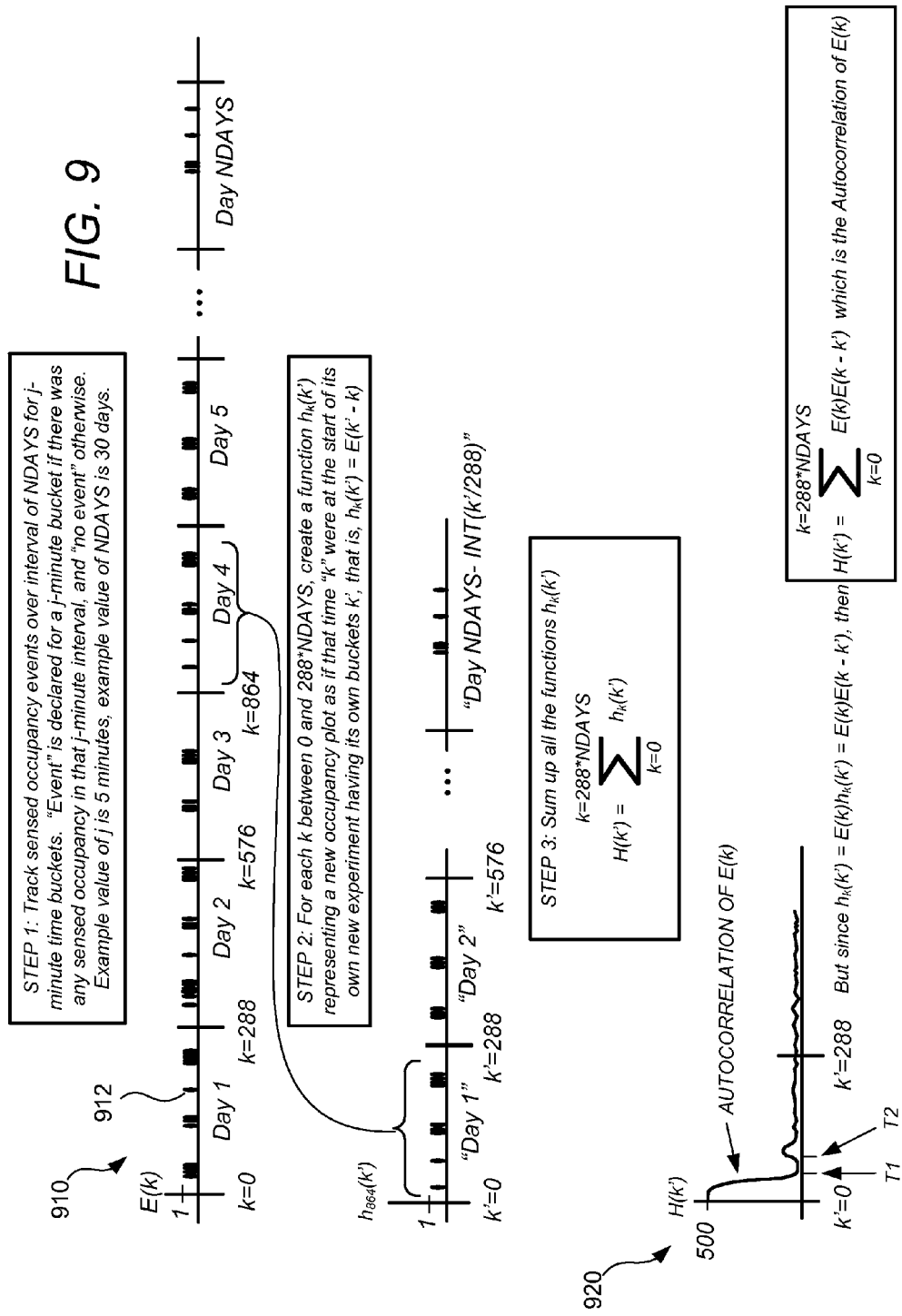
FIG. 9 illustrates plots that relate to the determination of optimal time thresholds for (i) triggering an auto-away state, and (ii) temporarily inhibiting an auto-arrival state upon entry into an auto-away state, according to some embodiments.

Further detail will now be provided regarding the ASCW (away state confidence window) and the AAIW (auto-arrival inhibition window). FIG. 9 illustrates plots 910 and 920 that relate to the determination of optimal time thresholds for (i) triggering an auto-away state, and (ii) temporarily inhibiting an auto-arrival state upon entry into an auto-away state, based on empirical data from a population of actual households. In the example of FIG. 9, the experiment is performed for a single household, but the method is readily generalized for multiple households by suitable statistical combinations of their individual results. The experiment can proceed as follows. For a time period of NDAYS (which may be, for example, a 30-day period although other durations are readily applicable), occupancy sensor activity is tracked for the household and characterized in terms of time buckets of a predetermined duration, such as 5 minutes (although other time bucket durations are readily applicable). More particularly, the occupancy pattern is characterized by a binary function E(k) that, for any particular kth time bucket, is equal to "0" if there was no sensed activity (no "occupancy event") in that interval, and is equal to "1" if there was sensed activity (an "occupancy event") in that interval. Shown in FIG. 9 is a plot 910 of the function E(k) that characterizes 288 time buckets (24 hours divided by 5 minutes) for each day, for a period of NDAYS, where there is a mark 912 representative of each occupancy event. According to an embodiment, it is desirable to characterize the predictive value that any particular occupancy event may have with respect to the subsequent occupancy events occurring thereafter, and then to process that information to determine optimal auto-away thresholds. Such a characterization can be found by forming a plot of subsequent occupancy event arrival times for each occupancy event, and then summing those plots over all occupancy events to form a histogram. Mathematically, these steps are equivalent to computing an autocorrelation of the function E(k), which is shown at plot 920. It has been found that, for practical experimental data taken over a population of households, the autocorrelation function (or a suitable smoothed version thereof) will have a central lobe that falls to a valley somewhere near a first time value T1, and then a first side lobe that begins rising out of that valley at a subsequent time T2. According to a preferred embodiment, the value T1 is used as a time threshold for triggering an auto-away state (ASCW, supra), while the difference (T2–T1) is used as the time interval for temporarily inhibiting an auto-arrival state upon entry into an auto-away state (AAIW, supra). In one series of real-world experiments, it has been found that T1 tends to hover around 120 minutes, while T2 tends to hover around 150 minutes. In one preferred embodiment, there is a single set of thresholds T1 and T2 that are used in all thermostats that are provisioned to customers, these numbers being computed previously during product development based on large statistical samples. For another preferred embodiment, the process shown in FIG. 9 (i.e., occupancy event tracking, autocorrelation, and determination of T1 and T2 from the lobes of the autocorrelation plot) is automatically performed by the thermostat for each individual installation, thereby providing a custom set of thresholds T1 and T2 that are optimal for each particular household. For still another preferred embodiment, the occupancy event tracking is performed by each thermostat, while the plots E(k) are communicated up to a cloud server that performs the described autocorrelation and/or any of a variety of other statistical algorithms to determine optimal values for T1 and T2, and those values are then downloaded from the cloud server to that individual thermostat.

According to some embodiments, certain adjustments or adaptations can be made to improve the auto-away auto-arrival behavior. If a user manually enters an "away" mode (which can be referred to as an "Away-Manual" state that is not shown in FIG. 8) then it is assumed that the residence is unoccupied—and if the occupancy sensors detect activity then it should be assumed that it is a false positive. Accordingly, according to some embodiments, during an "Away-Manual" state, a check is made to see if an auto-arrival had been detected by the activity sensors (i.e. sensor activity is detected in the last N consecutive buckets) then the algorithm is adjusted to make auto-arrival more robust (i.e. less sensitive). According to one preferred embodiment, if sensor activity is detected in the last N consecutive buckets within the previous 30 minutes of an "Away-Manual" state, then the number N is incremented by one.

According to another example, if the user makes a manual temperature setting (i.e. manual override) to a temperature below the least energetic setpoint (which is many cases is the away-state temperature) then it can be assumed that the user did this because the user expects the structure to become non-occupied. This can be interpreted similarly to entering a "Manual Away" state, and accordingly if sensor activity is detected in the last N consecutive buckets within the previous 30 minutes, then the number N is incremented by one (so as to make the auto-arrival less sensitive—i.e. "more robust" in that a greater amount of bustle will be needed to trigger an auto-arrival determination).

According to some embodiments, the ASCW is adjusted based on a "punishing" behavior. For example, if the user manually brings the device from Away-Normal state 820 back to Home state 810 within the first 30 minutes of entering the Away-Normal state 820, then the ASCW is increased. It has been found that increasing the ASCS by 30 minutes upon such occurrence is suitable for enhancing the operation of the auto-away functionality in many cases. Optionally, principles similar to those described above in relation to FIGS. 7A-7D may automatically operate to "ratchet" the ASCW back down if it gets so large that the intra-day auto-away state becomes rarely invoked.

According to some embodiments, the above-described auto-away functionality is judiciously integrated with other aspects of the operation of thermostat 300 hardware in a manner that achieves other desirable results. By way of example, for one preferred embodiment, the existence and circumstances of the AAIW are advantageously leveraged to conserve electrical power consumption that would otherwise be used by and/or triggered by the occupancy detection hardware. Thus, in one preferred embodiment, the occupancy sensing hardware in the thermostat 300 (such as a passive infrared sensor, active infrared proximity sensor, ultrasound sensor, or other sensors) is disabled during the AAIW, since there is no need to sense something if no responsive action is going to be taken anyway. For other preferred embodiments, the occupancy sensing hardware can be disabled during "manual away" mode and/or away-vacation mode for similar reasons.

In accordance with the teachings of the commonly assigned U.S. Ser. No. 13/269,501, supra, the commonly assigned U.S. Ser. No. 13/275,307, supra, and others of the commonly assigned incorporated applications, supra, for some embodiments the thermostat 300 can be an advanced, multi-sensing, microprocessor-controlled intelligent or "learning" thermostat that provides a rich combination of processing capabilities, intuitive and visually pleasing user interfaces, network connectivity, and energy-saving capabilities (including the presently described auto-away/auto-arrival algorithms) while at the same time not requiring a so-called "C-wire" from the HVAC system or line power from a household wall plug, even though such advanced functionalities can require a greater instantaneous power draw than a "power-stealing" option (i.e., extracting smaller amounts of electrical power from one or more HVAC call relays) can safely provide. The thermostat 300 achieves these goals at least by virtue of the use of a rechargeable battery (or equivalently capable onboard power storage medium) that will recharge during time intervals in which the hardware power usage is less than what power stealing can safely provide, and that will discharge to provide the needed extra electrical power during time intervals in which the hardware power usage is greater than what power stealing can safely provide.

In order to operate in a battery-conscious manner that promotes reduced power usage and extended service life of the rechargeable battery, the thermostat 300 is provided with both (i) a relatively powerful and relatively power-intensive first processor (such as a Texas Instruments AM3703 microprocessor) that is capable of quickly performing more complex functions such as driving a visually pleasing user interface display and performing various mathematical learning computations, and (ii) a relatively less powerful and less power-intensive second processor (such as a Texas Instruments MSP430 microcontroller) for performing less intensive tasks, including driving and controlling the occupancy sensors. To conserve valuable power, the first processor is maintained in a "sleep" state for extended periods of time and is "woken up" only for occasions in which its capabilities are needed, whereas the second processor is kept on more or less continuously (although preferably slowing down or disabling certain internal clocks for brief periodic intervals to conserve power) to perform its relatively low-power tasks. The first and second processors are mutually configured such that the second processor can "wake" the first processor on the occurrence of certain events, which can be termed "wake-on" facilities. These wake-on facilities can be turned on and turned off as part of different functional and/or power-saving goals to be achieved. For example, a "wake-on-PROX" facility can be provided by which the second processor, when detecting a user's hand approaching the thermostat dial by virtue of an active proximity sensor (PROX, such as provided by a Silicon Labs SI1142 Proximity/Ambient Light Sensor with I2C Interface), will "wake up" the first processor so that it can provide a visual display to the approaching user and be ready to respond more rapidly when their hand touches the dial. As another example, a "wake-on-PIR" facility can be provided by which the second processor will wake up the first processor when detecting motion somewhere in the general vicinity of the thermostat by virtue of a passive infrared motion sensor (PIR, such as provided by a PerkinElmer DigiPyro PYD 1998 dual element pyrodetector). Notably, wake-on-PIR is not synonymous with auto-arrival, as there would need to be N consecutive buckets of sensed PIR activity to invoke auto-arrival, whereas only a single sufficient motion event can trigger a wake-on-PIR wake-up.

Generally speaking, the wake-on-PROX facility will most often be enabled at all times, since the PROX sensor is preferably configured to detect very meaningful user motion very near (e.g., within 0.75 meter or less) of the thermostat. According to one preferred embodiment, the wake-on-PIR facility is never activated during a "Home" state, so that electrical power for the thermostat is conserved by avoiding unnecessary wake-ups of the first processor, while the wake-on-PIR facility is activated during an auto-away state, such that the first processor will be able to assess the meaning of detected motion activity (including entering auto-arrival of there have been N consecutive buckets of sensed activity). For one preferred embodiment, however, the wake-on-PIR facility is kept inactive during the AAIW (auto-arrival inhibition window) to further save power, since the first processor will not be entering auto-arrival mode during that period anyway.

For one preferred embodiment, the following wake-on and first processor wake-up rules are applicable. As discussed above, the wake-on-PIR facility is disabled during the "Home" state. During the Away-Normal state, if the time since entering that state is less than the AAIW (such as 30 minutes), then the wake-on-PIR facility is disabled but a timer is set to wake up the first processor at the end of that 30 minute interval. During the Away-Normal state, if the time since entering that state is more than the AAIW, then the wake-on-PIR facility is enabled, and a timer is set to wake up the first processor at the effective time of the next setpoint in the thermostat schedule. During the Away-Normal state, if there has been a wake-on-PIR event, then the wake-on-PIR facility is disabled for the remaining duration of the time "bucket" interval used for auto-arrival determination (for example 5 minutes), and a timer is set to wake up the first processor at the beginning of the next "bucket" interval. This is advantageous in saving power for the remainder of that "bucket" interval, because the wake-on-PIR event has already filled that bucket, and any additionally sensed wake-on-PIR events during that bucket would be superfluous and would just waste power. The wake-on-PIR facility is then re-activated at the beginning of the next "bucket" interval. Advantageously, electrical power is conserved while at the same time enabling the detection of "N" contiguous buckets of sensed activity.

An analogous power-preserving scheme can also be employed for the Away-Vacation state. During the Away-Vacation state, if the time since entering that state is less than some threshold time period (which can be the AAIW or some other suitable "latching" time period), then the wake-on-PIR facility is disabled but a timer is set to wake up the first processor at the end of that interval. During the Away-Vacation state, if the time since entering that state is more than that threshold time period, then the wake-on-PIR facility is enabled, and a timer is set to wake up the first processor in 24 hours (or other suitable "sanity-check" interval). During the Away-Vacation state, if there has been a wake-on-PIR event, then the wake-on-PIR facility is disabled for the remaining duration of the time "bucket" interval used for auto-arrival determination, and a timer is set to wake up the first processor at the beginning of the next "bucket" interval, thereby conserving electrical power for the remainder of the current "bucket" interval.

Further detail is provided hereinbelow with respect to operation when multiple thermostats are installed, according to some embodiments. FIG. 10A illustrates a particular enclosure, such as a family home, which has three thermostats connected to two different HVAC systems, according to some embodiments. The enclosure 1000 has thermostats 1010 and 1020 which control a downstairs HVAC system located 1042 on a downstairs floor and thermostat 1030 to control an upstairs HVAC system 1040 located on an upstairs floor. Where the thermostats have become logically associated with a same user account at a cloud-based management server 1060, the three thermostats advantageously cooperate with one another in providing optimal HVAC control of the enclosure as a whole. Such cooperation between the three thermostats can be direct peer-to-peer cooperation, or can be supervised cooperation in which the central cloud-based management server supervises them as one or more of a master, referee, mediator, arbitrator, and/or messenger on behalf of the two thermostats. In one example, an enhanced auto-away capability is provided, wherein an "away" mode of operation is invoked only if both of the thermostats have sensed a lack of activity for a requisite period of time. For one embodiment, each thermostat will send an away-state "vote" to the management server 1060 if it has detected inactivity for the requisite period, but will not go into an "away" state until it receives permission to do so from the management server. In the meantime, each thermostat will send a revocation of its away-state vote if it detects occupancy activity in the enclosure. The central management server 1060 will send away-state permission to all three thermostats only if there are current away-state votes from each of them. Once in the collective away-state, if any of the thermostats senses occupancy activity, that thermostat will send a revocation to the cloud-based management server 1060, which in turn will send away-state permission revocation (or an "arrival" command) to all three of the thermostats. Many other types of cooperation among the commonly paired thermostats (i.e., thermostats associated with the same account at the management server) can be provided without departing from the scope of the present teachings.

FIG. 10B illustrates examples of implementation of auto-away functionality for multi-thermostat installation settings, according to some embodiments. One preferred method by which that group of thermostats (which includes thermostats 1010, 1020 and 1030) can cooperate to provide enhanced auto-away functionality is as follows. Each thermostat maintains a group state information object that includes (i) a local auto-away-ready (AAR) flag that reflects whether that individual thermostat considers itself to be auto-away ready, and (ii) one or more peer auto-away-ready (AAR) flags that reflect whether each other thermostat in the group considers itself to be auto-away ready. The local AAR flag for each thermostat appears as a peer AAR flag in the group state information object of each other thermostat in the group. Each thermostat is permitted to change its own local AAR flag, but is only permitted to read its peer AAR flags. It is a collective function of the central cloud-based management server and the thermostats to communicate often enough such that the group state information object in each thermostat is maintained with fresh information, and in particular that the peer AAR flags are kept fresh. This can be achieved, for example, by programming each thermostat to immediately communicate any change in its local AAR flag to the management server, at which time the management server can communicate that change immediately with each other thermostat in the group to update the corresponding peer AAR flag. Other methods of direct peer-to-peer communication among the thermostats can also be used without departing from the scope of the present teachings.

According to a preferred embodiment, the thermostats operate in a consensus mode such that each thermostat will only enter into an actual "away" state if all of the AAR flags for the group are set to "yes" or "ready". Therefore, at any particular point in time, either all of the thermostats in the group will be in an "away" state, or none of them will be in the "away" state. In turn, each thermostat is configured and programmed to set its AAR flag to "yes" if either or both of two sets of criteria are met. The first set of criteria is met when all of the following are true: (i) there has been a period of sensed inactivity for a requisite inactivity interval according to that thermostat's sensors such as its passive infrared (PIR) motion sensors, active infrared proximity sensors (PROX), and other occupancy sensors with which it may be equipped; (ii) the thermostat is "auto-away confident" in that it has previously qualified itself as being capable of sensing statistically meaningful occupant activity at a statistically sufficient number of meaningful times, and (iii) other basic "reasonableness criteria" for going into an auto-away mode are met, such as (a) the auto-away function was not previously disabled by the user, (b) the time is between 8 AM and 8 PM if the enclosure is not a business, (c) the thermostat is not in OFF mode, (d) the "away" state temperature is more energy-efficient than the current setpoint temperature, and (e) the user is not interacting with the thermostat remotely through the cloud-based management server. The second set of criteria is met when all of the following are true: (i) there has been a period of sensed inactivity for a requisite inactivity interval according to that thermostat's sensors, (ii) the AAR flag of at least one other thermostat in the group is "yes", and (iii) the above-described "reasonableness" criteria are all met. Advantageously, by special virtue of the second set of alternative criteria by which an individual thermostat can set its AAR flag to "yes", it can be the case that all of the thermostats in the group can contribute the benefits of their occupancy sensor data to the group auto-away determination, even where one or more of them are not "auto-away confident," as long as there is at least one member that is "auto-away confident." This method has been found to increase both the reliability and scalability of the energy-saving auto-away feature, with reliability being enhanced by virtue of multiple sensor locations around the enclosure, and with scalability being enhanced in that the "misplacement" of one thermostat (for example, installed at an awkward location behind a barrier that limits PIR sensitivity) causing that thermostat to be "away non-confident" will not jeopardize the effectiveness or applicability of the group consensus as a whole.

It is to be appreciated that the above-described method is readily extended to the case where there are multiple primary thermostats and/or multiple auxiliary thermostats. It is to be further appreciated that, as the term primary thermostat is used herein, it is not required that there be a one-to-one correspondence between primary thermostats and distinct HVAC systems in the enclosure. For example, there are many installations in which plural "zones" in the enclosure may be served by a single HVAC system by virtue of controllable dampers that can stop and/or redirect airflow to and among the different zones from the HVAC system. In such cases, there can be a primary thermostat for each zone, each of the primary thermostats being wired to the HVAC system as well as to the appropriate dampers to regulate the climate of its respective zone.

In the case 1050 shown in FIG. 10B, two of the three thermostats 1010 and 1020 have AAR flags set to "Yes," indicating they have not sensed activity within the ASCW and other criteria are met. However the third thermostat 1030 has the AAR Flag set to "No," for example, because it has sensed activity recently. Since the not all of the thermostats have AAR flags set to "Yes," the decision is not unanimous and therefore the Away state is not entered by any of the thermostats. An example of case 1050 might be that the sole occupant of the dwelling 1000 is upstairs for an extended period of time and therefore only thermostat 1030 is detecting occupancy.

In the case 1052, all of the thermostats 1010, 1020 and 1030 are sufficiently confident, have not sensed activity within the ASCW, and have set their AAR flags to "Yes." Accordingly, the decision to enter Away state is unanimous and the away state is implemented in all three thermostats.

In case 1052, one of the thermostats, 1020 has insufficient confidence in its activity sensor data. This could be, for example that it has been newly installed, or it could be due to poor placement for occupancy sensing (e.g. its "view" is severely limited by walls and/or doors). The other two thermostats 1010 and 1030 have sufficient confidence, have not detected activity within the ASCW and have set their AAR flags to "Yes." In this case the thermostat 1020 "sees" the other "Yes" flags and changes its flag to "Yes." The decision is unanimous and the Away state is implemented. In this case the thermostat 1020 that had low confidence was not allowed to "veto" the decision of the the two confident thermostats 1010 and 1030.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

The invention claimed is:

1. A method for controlling temperature in a conditioned enclosure comprising:
   controlling temperature within the conditioned enclosure according to a first setpoint, the first setpoint being from a preexisting schedule and representing a temperature suitable when one or more persons are occupying the conditioned enclosure;
   receiving data reflecting one or more occupancy sensors adapted to detect occupancy within the conditioned enclosure; and
   automatically changing the setpoint temperature to a second setpoint upon expiration of a predetermined time interval during which no occupancy has been detected, the second setpoint requiring substantially less energy to maintain than the first setpoint, wherein the predetermined time interval is modified based at least in part on received manual settings that indicate occupancy following the changing to the second setpoint.

2. A method according to claim 1 further comprising automatically changing the setpoint temperature from the second setpoint to a third setpoint, the third setpoint being from the preexisting schedule.

3. A method according to claim 2 wherein the third setpoint is substantially equal to the first setpoint.

4. A method according to claim 1 wherein the predetermined time interval is 60 minutes or greater.

5. A method according to claim 4 wherein the predetermined time interval is between about 90 minutes and 180 minutes.

6. A method according to claim 5 wherein the predetermined time interval is about 120 minutes.

7. A method according to claim 1 wherein the receiving of data and automatically changing occur in daytime hours.

8. A method according to claim 1 wherein the conditioned enclosure is at least part of a dwelling.

9. A method according to claim 8 wherein the conditioned enclosure is at least part of a single-family dwelling.

10. A method according to claim 1 wherein the conditioned enclosure is at least part of a light commercial building.

11. A method according to claim 1 wherein the automatic changing does not occur during times when occupants of the conditioned enclosure are expected to be sleeping.

12. A programmable thermostat comprising a processing system and circuitry to carry out the method of claim 1.

13. A method for controlling temperature in a conditioned enclosure comprising:
- controlling temperature within the conditioned enclosure according to a first setpoint, the first setpoint being from a preexisting schedule and representing a temperature suitable when one or more persons are occupying the conditioned enclosure;
- receiving data reflecting one or more occupancy sensors adapted to detect occupancy within the conditioned enclosure; and
- automatically changing the setpoint temperature to a second setpoint upon expiration of a predetermined time interval during which no occupancy has been detected, the second setpoint requiring substantially less energy to maintain than the first setpoint, wherein the predetermined time interval is modified based at least in part on prior received data and prior automatic changes of setpoints in the conditioned enclosure.

14. A method for controlling temperature in a conditioned enclosure comprising:
- controlling temperature within the conditioned enclosure according to a first setpoint, the first setpoint being from a preexisting schedule and representing a temperature suitable when one or more persons are occupying the conditioned enclosure;
- receiving data reflecting one or more occupancy sensors adapted to detect occupancy within the conditioned enclosure;
- automatically changing the setpoint temperature to a second setpoint upon expiration of a predetermined time interval during which no occupancy has been detected, the second setpoint requiring substantially less energy to maintain than the first setpoint; and
- automatically changing the setpoint temperature to a third setpoint upon expiration of a second predetermined time interval during which no occupancy has been detected, wherein the second time interval is substantially longer than the first time interval.

15. A method according to claim 14 wherein the third setpoint is substantially equal to the second setpoint.

16. A method according to claim 14 wherein the third setpoint uses substantially less energy to maintain then the second setpoint.

17. A method according to claim 14 wherein the second time interval is 24 hours or longer.

18. A method according to claim 14 wherein the second time interval is selected such that non-occupancy during the second time interval is likely to reflect a multi-day non-occupancy period in the conditioned enclosure.

19. A method for controlling temperature in a conditioned enclosure comprising:
- controlling temperature within the conditioned enclosure according to a first setpoint, the first setpoint being from a preexisting schedule and representing a temperature suitable when one or more persons are occupying the conditioned enclosure;
- receiving data reflecting one or more occupancy sensors adapted to detect occupancy within the conditioned enclosure;
- automatically changing the setpoint temperature to a second setpoint upon expiration of a predetermined time interval during which no occupancy has been detected, the second setpoint requiring substantially less energy to maintain than the first setpoint; and
- modifying the preexisting schedule based at least in part on two or more automatic changes of the setpoint temperature.

20. A method according to claim 19 wherein the two or more automatic changes occur at similar times on consecutive days or on similar days of consecutive weeks.

21. A method for controlling temperature in a conditioned enclosure comprising:
- controlling temperature within the conditioned enclosure according to a first setpoint, the first setpoint being from a preexisting schedule and representing a temperature suitable when one or more persons are occupying the conditioned enclosure;
- receiving data reflecting one or more occupancy sensors adapted to detect occupancy within the conditioned enclosure;
- automatically changing the setpoint temperature to a second setpoint upon expiration of a predetermined time interval during which no occupancy has been detected, the second setpoint requiring substantially less energy to maintain than the first setpoint; and
- automatically changing the setpoint temperature to a third setpoint upon expiration of a second predetermined time interval during which no occupancy has been detected, wherein the second time interval is substantially longer than the first time interval, and wherein the first time interval is selected such that non-occupancy during the first time interval is likely to reflect an intra day non-occupancy period in the conditioned enclosure and the second time interval is selected such that non-occupancy during the second time interval is likely to reflect a interday non-occupancy period in the conditioned enclosure.

* * * * *